(12) United States Patent
Chen

(10) Patent No.: US 12,520,011 B2
(45) Date of Patent: Jan. 6, 2026

(54) VIDEO PLAYING METHOD AND APPARATUS, AND STORAGE MEDIUM

(71) Applicant: FUTU NETWORK TECHNOLOGY (SHENZHEN) CO., LTD., Guangdong (CN)

(72) Inventor: Jiayi Chen, Guangdong (CN)

(73) Assignee: FUTU NETWORK TECHNOLOGY (SHENZHEN) CO., LTD., Guangdong (CN)

( * ) Notice: Subject to any disclaimer, the term of this patent is extended or adjusted under 35 U.S.C. 154(b) by 96 days.

(21) Appl. No.: 18/399,735

(22) Filed: Dec. 29, 2023

(65) Prior Publication Data

US 2024/0137617 A1    Apr. 25, 2024

Related U.S. Application Data

(63) Continuation of application No. PCT/CN2022/100199, filed on Jun. 21, 2022.

(30) Foreign Application Priority Data

Jul. 13, 2021  (CN) .......................... 202110789130.8

(51) Int. Cl.
H04N 21/472       (2011.01)
H04N 21/2187      (2011.01)
(Continued)

(52) U.S. Cl.
CPC ... H04N 21/47217 (2013.01); H04N 21/2187 (2013.01); H04N 21/232 (2013.01); H04N 21/43074 (2020.08)

(58) Field of Classification Search
None
See application file for complete search history.

(56) References Cited

U.S. PATENT DOCUMENTS 9,817,558 B1    11/2017 Morris
2012/0070129 A1  3/2012 Lin et al.
(Continued)

FOREIGN PATENT DOCUMENTS

CN    106303664 A    1/2017
CN    108093290 A    5/2018
(Continued)

OTHER PUBLICATIONS

First Office Action dated Feb. 8, 2025 received in corresponding patent family application No. AU2022309659.
(Continued)

*Primary Examiner* — Omar S Parra

(57) ABSTRACT

A video playing method and apparatus, and a storage medium are provided. The video playing method includes: invoking a video component in response to a playing instruction for a target video; searching a video stream multiplexing pool corresponding to the video component for a first video stream identical to the target video, to play the target video based on the first video stream, the video stream multiplexing pool being configured to store video streams that have been played by the video component; synchronizing a playing progress of the target video in a video feed list with a playing progress of the target video in a video detail page during playing of the target video; and displaying, in response to a touch operation on a small window button, the target video on a small window, or displaying, in response to a touch operation on a full screen button, the target video on a full screen.

19 Claims, 16 Drawing Sheets

(51) Int. Cl.
*H04N 21/232* (2011.01)
*H04N 21/43* (2011.01)

(56) References Cited

U.S. PATENT DOCUMENTS

| | | |
|---|---|---|
| 2016/0098163 A1 | 4/2016 | Kim et al. |
| 2023/0224545 A1 | 7/2023 | Deng |

FOREIGN PATENT DOCUMENTS

| | | |
|---|---|---|
| CN | 109698979 A | 4/2019 |
| CN | 110062284 A | 7/2019 |
| CN | 110708602 A | 1/2020 |
| CN | 110753251 A | 2/2020 |
| CN | 110958481 A | 4/2020 |
| CN | 111629251 A | 9/2020 |
| CN | 111954072 A | 11/2020 |
| CN | 113507632 A | 10/2021 |
| CN | 113573121 A | 10/2021 |
| CN | 114501134 A | 5/2022 |
| JP | 2009177533 A | 8/2009 |
| JP | 2010068340 A | 3/2010 |
| JP | 2013157759 A | 8/2013 |
| JP | 2020514892 A | 5/2020 |

OTHER PUBLICATIONS

Notice of Reasons for Refusal dated Jan. 28, 2025 received in corresponding patent family application No. JP2023580935. English translation attached.
International Search Report dated Sep. 21, 2022 in International Application No. PCT/CN2022/100199. English translation attached.
First Office Action from corresponding Chinese Application No. 202110789130.8, dated Jan. 5, 2022. English translation attached.
The Grant Notice from corresponding Chinese Application No. 202110789130.8, dated Mar. 8, 2023. English translation attached.

Small window playing (portrait)

Small window playing (portrait)

Click on it to go to a detail page

Clicking on a blank space, invoke/hide the control

| Video component | Whether visibility is configurable | Whether display is needed | Available scenarios (mode 1) | | | | | | | | Control specification (display/interact) |
|---|---|---|---|---|---|---|---|---|---|---|---|
| | | | Unplayed state | Playing state (initial) | Playing state (immersive) | Playing state (non-immersive) | Loading state (initial) | Loading state (immersive) | Loading state (non-immersive) | Paused state (non-immersive) | End state | Failure state |
| View counts | Yes | No | ✓ | ✓ | | | | | | | | | Stay in an immersive mode; view count conversion rules multiplex "video-specific logic". |
| Video duration | Yes | Yes | ✓ | ✓ | | | ✓ | | | | | | Stay in an immersive mode; display rules multiplex "video-specific logic"; when view counts are not displayed, a position of the video duration is moved forwards. |
| Volume switch | No | Yes | ✓ | ✓ | | | ✓ | | | | | | Stay in an immersive mode; interactions multiplex "video-specific logic". |
| Played length | Yes | Yes | | | | ✓ | | | ✓ | ✓ | | | Display in a non-immersive mode; interactions multiplex "video-specific logic". |
| Progress bar | Yes | Yes | | | | ✓ | | | ✓ | ✓ | | | Display in a non-immersive mode; interactions multiplex "video-specific logic". |
| Weak version of the progress bar | Yes | Yes | | | ✓ | | | | | | | | Display in an immersive mode; static display. |
| Full screen button | Yes | Yes | | | | ✓ | | | ✓ | | | | Display in a non-immersive mode; display a player directly when clicked. |
| Buffering | No | Yes | | | | | | ✓ | ✓ | | | | Display only in a loading state; purely textual prompt. |
| Replay button | No | Yes | | | | | | | | | ✓ | | Display only at the end of playing; start playing from the beginning when clicked. |
| Play button | No | Yes | | | | ✓ | | | | ✓ | | | Display in a paused non-immersive mode in an unplayed state, start playing when clicked, continue playing. |
| Pause button | No | Yes | | | | ✓ | | | | | | | Display in a non-immersive mode in a playing state, pause playing when clicked. |
| Loading failure prompt + retry button | No | Yes | | | | | | | | | | ✓ | Display when loading fails; re-play after clicking the retry button. |

FIG. 9

Mode 2
Unplayed state
Playing state (initial state)
Playing state
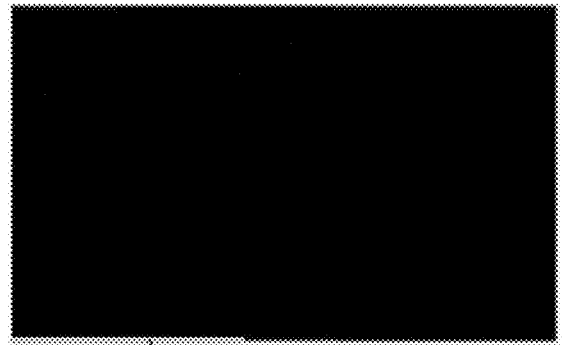
Loading state (initial state)
Loading state — Weak version of a progress bar
End state
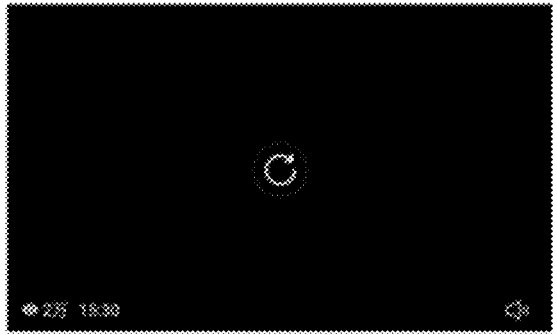
Failure state
FIG. 10

| Video component | Whether visibility is configurable | Whether display is needed | Available scenarios (mode 2) | | | | | | Control specification (display/interact) |
|---|---|---|---|---|---|---|---|---|---|
| | | | Unplayed state | Playing state (initial) | Playing state | Loading state | Loading state | End state | Failure state | |
| View counts | Yes | No | √ | √ | | √ | | | | Stay in an immersive mode; view count conversion rules multiplex "video-specific logic"; |
| Video duration | Yes | Yes | √ | √ | | √ | | | | Stay in an immersive mode; display rules multiplex "video-specific logic"; when view counts are not displayed, a position of the video duration is moved forwards; |
| Volume switch | No | Yes | | √ | | √ | | | | Stay in an immersive mode; interactions multiplex "video-specific logic"; |
| Played length | Yes | Yes | | | | | | | | Display in a non-immersive mode; interactions multiplex "video-specific logic"; |
| Progress bar | Yes | Yes | | | | | | | | Display in a non-immersive mode; interactions multiplex "video-specific logic"; |
| Weak version of the progress bar | Yes | Yes | | | | √ | | | | Display in an immersive mode; static display; |
| Full screen button | Yes | Yes | | | | | | | | Display in a non-immersive mode; display a player directly when clicked |
| Buffering | No | Yes | | | | | √ | | | Display only in a loading state; purely textual prompt; |
| Replay button | No | Yes | | | | | | | √ | Display only at the end of playing; start playing from the beginning when clicked; |
| Play button | No | Yes | √ | | | | | | | Display in a paused non-immersive mode in an unplayed state, start playing when clicked, continue playing; |
| Pause button | No | Yes | | | | | | | | Display in a non-immersive mode in a playing state, pause playing when clicked; |
| Loading failure prompt+ retry button | No | Yes | | | | | | √ | | Display when loading fails; re-play after clicking the retry button. |

FIG. 11

| Video component | Whether visibility is configurable | Whether display is needed | Available scenarios (mode 3) | | | | | | | | | Control specification (display/interact) |
|---|---|---|---|---|---|---|---|---|---|---|---|---|
| | | | (Unplayed state | Playing state (immersive) | Playing state (non-immersive) | Loading state (immersive) | Loading state (non-immersive) | Paused state (immersive) | Paused state (non-immersive) | End state | Failure state | |
| More in an upper right corner | Yes | No | ✓ | | | | | | | | | Display in a non-immersive mode; interactions multiplex "video-specific logic". |
| Played length | Yes | Yes | ✓ | | ✓ | | ✓ | | ✓ | | | Display in a non-immersive mode; interactions multiplex "video-specific logic". |
| Progress bar | Yes | Yes | ✓ | | ✓ | | ✓ | | ✓ | | | Display in a non-immersive mode; interactions multiplex "video-specific logic". |
| Weak version of the progress bar | Yes | Yes | | ✓ | | ✓ | | ✓ | | | | Display in an immersive mode; interactions multiplex "video-specific logic". |
| Full screen button | Yes | Yes | ✓ | | ✓ | | ✓ | | ✓ | | | Display in a non-immersive mode; interactions multiplex "video-specific logic". |
| Small window button | Yes | Yes | ✓ | | ✓ | | ✓ | | ✓ | | | Display in a non-immersive mode; interactions multiplex "video-specific logic". |
| Buffering | No | Yes | | | | ✓ | ✓ | | | | | Display only in a loading state; purely textual prompt. |
| Replay button | No | Yes | | | | | | | | ✓ | | Display only at the end of playing; start playing from the beginning when clicked. |
| Play button | No | Yes | | | | | ✓ | | ✓ | | | Display in a paused non-immersive mode in an unplayed state, start playing when clicked; continue playing. |
| Pause button | No | Yes | | | ✓ | | | | | | | Display in a non-immersive mode in a playing state, pause playing when clicked. |
| Loading failure prompt + retry button | No | Yes | | | | | | | | | ✓ | Display when loading fails; replay after clicking the retry button. |
| Gesture | Yes | Yes | ✓ | ✓ | ✓ | ✓ | ✓ | ✓ | ✓ | | | interactions multiplex "video-specific logic". |
| Return button | No | No | ✓ | | ✓ | | ✓ | | ✓ | ✓ | | Close a current player when the return button is clicked. |
| Upper-right corner ... | Yes | No | ✓ | | ✓ | | ✓ | | ✓ | ✓ | | Entry icon mode, invoke contents, customizations by businesses. |

FIG. 13

Unplayed state
Mode 4
Playing state (non-immersive mode)
Playing state (immersive mode)
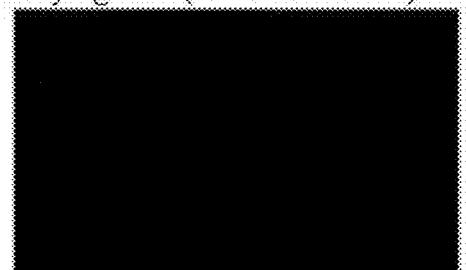
— Weak version of a progress bar
Loading state (non-immersive mode)
Loading state (immersive mode)
— Weak version of a progress bar
Paused state (non-immersive state)
Paused state (immersive state)
— Weak version of a progress bar
End state
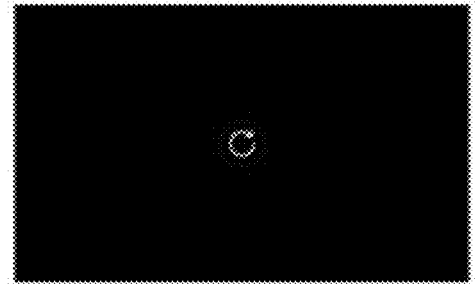
Failure state
FIG. 14

| Video component | Whether visibility is configurable | Whether display is needed | Available scenarios (mode 4) | | | | | | | | Control specification (display/interact) |
|---|---|---|---|---|---|---|---|---|---|---|---|
| | | | Unplayed state | Playing state (immersive) | Playing state (non-immersive) | Loading state (immersive) | Loading state (non-immersive) | Paused state (immersive) | Paused state (non-immersive) | End state | Failure state | |
| Video title | Yes | No | ✓ | | ✓ | | ✓ | | ✓ | ✓ | | Display in a non-immersive mode; interactions multiplex "video-specific logic". |
| Played length | Yes | Yes | ✓ | | ✓ | | ✓ | | ✓ | | | Display in a non-immersive mode; interactions multiplex "video-specific logic". |
| Progress bar | Yes | Yes | ✓ | | ✓ | | ✓ | | ✓ | | | Display in a non-immersive mode; interactions multiplex "video-specific logic". |
| Weak version of the progress bar | Yes | Yes | | ✓ | | ✓ | | ✓ | | | | Display in an immersive mode; interactions multiplex "video-specific logic". |
| Speed up | Yes | Yes | ✓ | | ✓ | | ✓ | | ✓ | | | Display in a non-immersive mode; interactions multiplex "video-specific logic". |
| Definition | Yes | Yes | ✓ | | ✓ | | ✓ | | ✓ | | | Display in a non-immersive mode; interactions multiplex "video-specific logic". |
| Small window button | Yes | Yes | ✓ | | ✓ | | ✓ | | ✓ | ✓ | | Display in a non-immersive mode; interactions multiplex "video-specific logic". |
| Buffering | No | Yes | | | | | ✓ | | | | | Display only in a loading state; purely textual prompt. |
| Replay button | No | Yes | | | | | | | | ✓ | | Display only at the end of playing; start playing from the beginning when clicked. |
| Play button | No | Yes | | | | | ✓ | | ✓ | | | Display in a paused non-immersive mode in an unplayed state; start playing when clicked; continue playing. |
| Pause button | No | Yes | | | ✓ | | | | | | | Display in a non-immersive mode in a playing state; pause playing when clicked. |
| Loading failure prompt+retry button | No | Yes | | | | | | | | | ✓ | Display when loading fails; replay after clicking the retry button. |
| Gesture | Yes | Yes | ✓ | | ✓ | | ✓ | | ✓ | ✓ | | interactions multiplex "video-specific logic". |
| Return button | No | No | ✓ | | ✓ | | ✓ | | ✓ | ✓ | | Close a current player when the return button is clicked. |
| Upper right corner ... | Yes | No | ✓ | | ✓ | | ✓ | | ✓ | ✓ | | Entry icon mode; invoke contents customizations by businesses. |

FIG. 15

Small window mode
Playing state (non-immersive mode)
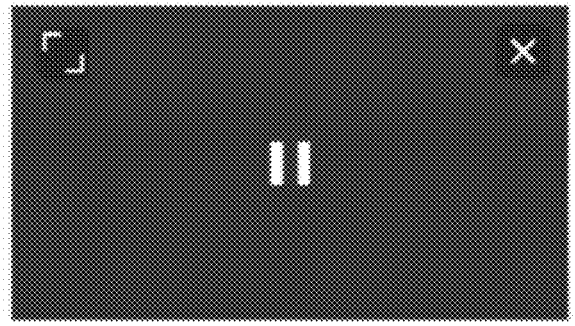
Playing state (immersive mode)
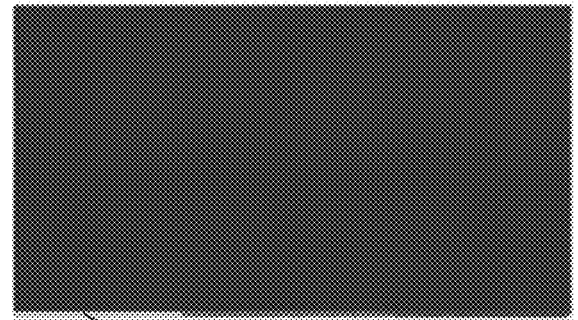
— Weak version of a progress bar
Loading state (non-immersive mode)
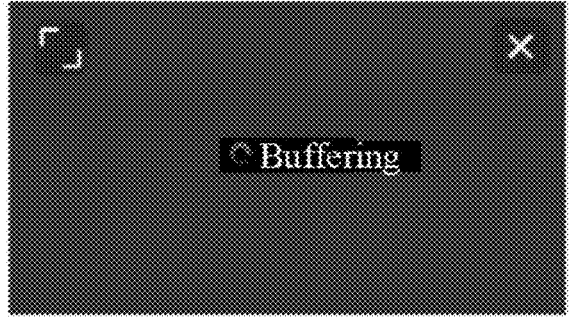
Loading state (immersive mode)
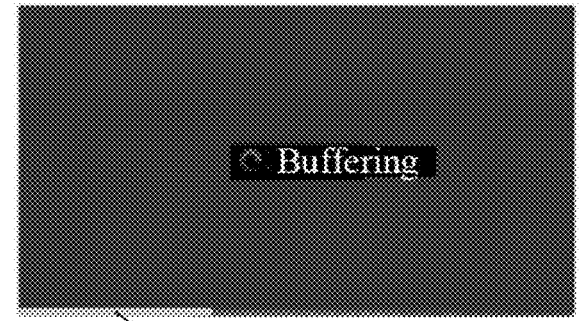
— Weak version of a progress bar
Paused state (non-immersive mode)
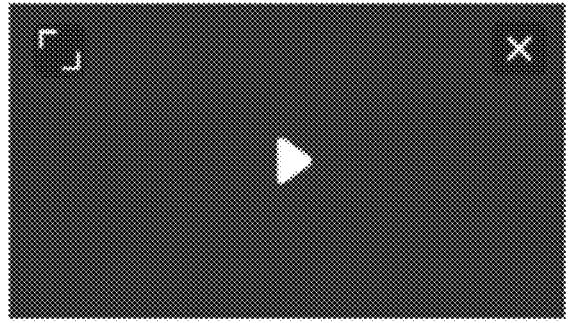
Paused state (immersive mode)
— Weak version of a progress bar
End state
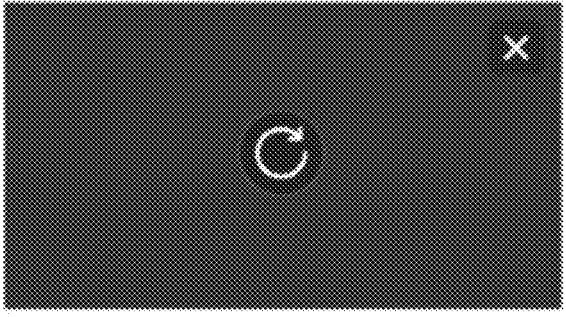
Failure state
FIG. 16

| Video component | Whether visibility is configurable | Whether display is needed | Available scenarios (small window mode) | | | | | | | | | Control (display/interact) specification |
|---|---|---|---|---|---|---|---|---|---|---|---|---|
| | | | Unplayed state | Playing state (immersive) | Playing state (non-immersive) | Loading state (immersive) | Loading state (non-immersive) | Paused state (immersive) | Paused state (non-immersive) | End state | Failure state | |
| Weak version of a progress bar | Yes | Yes | | ✓ | | | | | | | | Display in an immersive mode; interactions multiplex "video-specific logic". |
| Unfold button | No | Yes | ✓ | | ✓ | | ✓ | | ✓ | ✓ | | Display in a non-immersive mode; interactions multiplex "video-specific logic". |
| Close button | No | Yes | ✓ | | ✓ | | ✓ | | ✓ | ✓ | | Display in a non-immersive mode; interactions multiplex "video-specific logic". |
| Buffering | No | Yes | | | | ✓ | ✓ | | | | | Display only in a loading state; purely textual prompt; |
| Replay button | No | Yes | | | | | | | | ✓ | | Display only at the end of playing; start playing from the beginning when clicked; |
| Play button | No | Yes | ✓ | | | | ✓ | | ✓ | | | Display in a paused non-immersive mode in an unplayed state, start playing when clicked; continue playing. |
| Pause button | No | Yes | | | ✓ | | | | | | | Display in a non-immersive mode in a playing state, pause playing when clicked; |
| Loading failure prompt+ retry button | No | Yes | | | | | | | | | ✓ | Display when loading fails; replay after clicking the retry button. |

FIG. 17

VIDEO PLAYING METHOD AND APPARATUS, AND STORAGE MEDIUM

CROSS-REFERENCE TO RELATED APPLICATIONS

This application is a continuation of International Application No. PCT/CN2022/100199, filed on Jun. 21, 2022, which claims priority to Chinese Patent Application No. 202110789130.8, titled "VIDEO PLAYING METHOD AND APPARATUS, AND STORAGE MEDIUM", and filed on Jul. 13, 2021, the entire contents of which are incorporated herein by reference.

FIELD

The present disclosure relates to the field of computer technologies, and more particularly, to a video playing method and apparatus, and a storage medium.

BACKGROUND

At present, a video component is provided in a client application. However, the video component available in the market only provides basic logic and requires users to realize UI and functions on their own. In addition, it is difficult for the video component to realize video multiplexing. For the users, the process is cumbersome during use and operations are complicated, which affect user experience.

SUMMARY

Embodiments of the present disclosure provide a video playing method and apparatus, and a storage medium, which are capable of realizing video multiplexing, promoting function diversity of a video component, and reducing operation complexity.

In a first aspect, a video playing method is provided. The video playing method is applied to a client configured with a video component. The video playing method includes: invoking the video component in response to a playing instruction for a target video; searching a video stream multiplexing pool corresponding to the video component for a first video stream identical to the target video, to play the target video based on the first video stream, the video stream multiplexing pool having stored thereon video streams that have been played by the video component; synchronizing a playing progress of the target video in a video feed list with a playing progress of the target video in a video detail page during playing of the target video; and controlling, in response to a touch operation on a small window button of the video component, a small window control of the video component to display and play the target video, or controlling, in response to a touch operation on a full screen button of the video component, a full screen control of the video component to display the target video.

In a second aspect, a video playing apparatus is provided. The video playing apparatus is applied to a client configured with a video component. The video playing apparatus includes an invocation module, a playing module, a synchronization module, and a control module. The invocation module is configured to invoke the video component in response to a playing instruction for a target video. The playing module is configured to search a video stream multiplexing pool corresponding to the video component for a first video stream identical to the target video, to play the target video based on the first video stream. The video stream multiplexing pool has stored thereon video streams that have been played by the video component. The synchronization module is configured to synchronize a playing progress of the target video in a video feed list with a playing progress of the target video in a video detail page during playing of the target video. The control module is configured to control, in response to a touch operation on a small window button of the video component, a small window control of the video component to display and play the target video, or control, in response to a touch operation on a full screen button of the video component, a full screen control of the video component to display the target video.

In a third aspect, a computer-readable storage medium is provided. The computer-readable storage medium has computer programs stored thereon, and the computer programs are adapted to be loaded by a processor to implement the video playing method in the first aspect.

In a fourth aspect, a terminal device is provided. The terminal device includes a processor and a memory. The memory has computer programs stored thereon. The processor is configured to perform, by invoking the computer programs stored in the memory, t the video playing method described in the first aspect.

The embodiments of the present disclosure provide the video playing method and apparatus, and the storage medium, which are applied to a client configured with a video component. The video playing method includes: invoking the video component in response to a playing instruction for a target video; searching a video stream multiplexing pool corresponding to the video component for a first video stream identical to the target video, to play the target video based on the first video stream, the video stream multiplexing pool having stored thereon video streams that have been played by the video component; synchronizing a playing progress of the target video in a video feed list with a playing progress of the target video in a video detail page during playing of the target video; and controlling, in response to a touch operation on a small window button of the video component, a small window control of the video component to display and play the target video, or controlling, in response to a touch operation on a full screen button of the video component, a full screen control of the video component to display the target video. According to the embodiments of the present disclosure, the video component invoked directly based on the playing instruction can realize the video multiplexing. Furthermore, a small window function and a full screen function are encapsulated in the video component, which improves the function diversity of the video component. In addition, a user can realize small window playing or full screen playing by simply clicking the small window button or the full screen button, which reduces the operation complexity and improves convenience of the user in using the video component.

BRIEF DESCRIPTION OF THE DRAWINGS

FIG. 9 is a table of component specification information of the mode 1 according to an embodiment of the present disclosure.

FIG. 10 is a schematic diagram of an application scenario of mode 2 according to an embodiment of the present disclosure.

FIG. 11 is a table of component specification information of the mode 2 according to an embodiment of the present disclosure.

FIG. 13 is a table of component specification information of the mode 3 according to an embodiment of the present disclosure.

FIG. 14 is a schematic diagram of an application scenario of mode 4 according to an embodiment of the present disclosure.

FIG. 15 is a table of component specification information of the mode 4 according to an embodiment of the present disclosure.

FIG. 16 is a schematic diagram of an application scenario of a small window mode according to an embodiment of the present disclosure.

FIG. 17 is a table of component specification information of a small window mode according to an embodiment of the present disclosure.

DETAILED DESCRIPTION

Technical solutions in the embodiments of the present disclosure are clearly and completely described below combined with the drawings of the embodiments of the present disclosure. It is clear that the described embodiments are only some of the embodiments of the present disclosure, instead of all embodiments. Based on the embodiments in the present disclosure, all other embodiments obtained by those skilled in the art without inventive effort are to be encompassed by the scope of the present disclosure.

Embodiments of the present disclosure provide a video playing method and apparatus, and a storage medium. In an exemplary embodiment of the present disclosure, the video playing method according to the embodiments of the present disclosure may be performed by a terminal device. The terminal device may be a device such as a terminal or a server. The terminal may be a smartphone, a tablet computer, a laptop, a touch screen, a game console, a Personal Computer (PC), a Personal Digital Assistant (PDA), or other terminal devices. The server may be an independent physical server, a server cluster or distributed system composed of a plurality of physical servers, or a cloud server that provides cloud services, cloud databases, cloud computing, cloud functions, cloud storage, network services, cloud communication, middleware services, domain name services, security services, content delivery network services, big data, artificial intelligence platforms, and other basic cloud computing services. However, the present disclosure is not limited to any of these examples.

The embodiments will be described in detail below. It should be noted that the order of description of the following embodiments does not constitute limitation on the priority of the order of the embodiments.

The embodiments of the present disclosure provide a video playing method. The video playing method may be performed by a terminal or a server, or may be performed by both the terminal and the server. As an example, the embodiments of the present disclosure describe that the video playing method is performed by a terminal.

Figure 1:
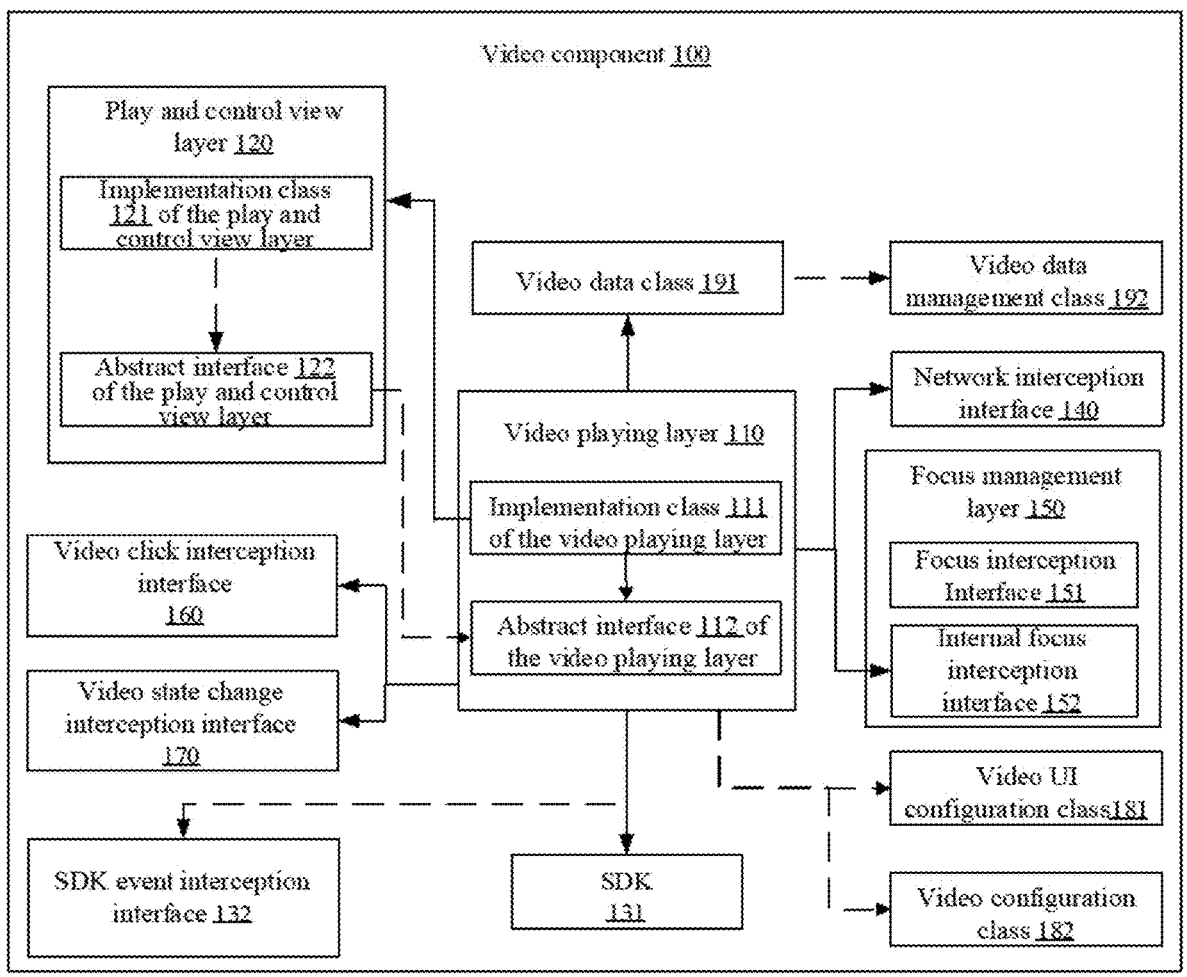
FIG. 1 is a schematic structural diagram of a video component according to an embodiment of the present disclosure.

FIG. 1 is a schematic structural diagram of a video component according to an embodiment of the present disclosure. Referring to FIG. 1, a video component 100 of the embodiment of the present disclosure mainly includes a video playing layer 110 and a play and control view layer 120.

The video playing layer 110 is configured to monitor a state callback of a Software Development Kit (SDK) and update a User Interface (UI) state of the play and control view layer. For example, the video playing layer 110 may include an implementation class 111 of the video playing layer and an abstract interface 112 of the video playing layer. A video may be played through the implementation class 111 of the video playing layer. The play and control view layer 120 may be manipulated through the abstract interface 112 of the video playing layer.

For example, the video playing layer 110 is configured to implement a video tool SDK processor (VideoSDKProcessor) class 131 that internally encapsulates an underlying video SDK. When the video SDK issues an event change notification, the event change notification is called back to the video playing layer through an interface, e.g., the event change notification is called back to the video playing layer 110 through an SDK event interception interface (ITXVodPlayListener) 132. For example, VideoSDK is configured to provide services including audio and video recording, special effect editing, character beauty, and other functions for mobile applications of Internet videos, which helps developers save labor and material costs while meeting diverse needs of users, helping developers simplify development work and realize quick business launch.

The play and control view layer 120 includes an implementation class 121 of the play and control view layer and an abstract interface 122 of the play and control view layer. UI control of the play and control view layer 120 may be realized through the implementation class 121 of the play and control view layer. For example, the play and control view layer 120 realizes a video production tool operation plug-in (IVideoOperateWidget) interface, which is the abstract interface 122 of the play and control view layer. The abstract interface (IVideoOperateListener) 112 of the video playing layer owns an IVideoOperateWidget object. The video playing layer 110 manipulates the play and control view layer through the IVideoOperateWidget object owned by the abstract interface 112 of the video playing layer. As a powerful and easy-to-use interactive video production tool, IVideo is based on video resources, and may include texts, images, hyperlinks, videos, audio, interactive game components, and many other interactive contents.

When the user operates a UI control of the play and control view layer 120, a state of the video playing layer 110 is updated based on an operation instruction generated by an operation performed by the user on the UI control of the play and control view layer 120. For example, the video playing layer 110 implements the video production tool plug-in (IVideoWidget) interface. When the play and control view layer 120 is added to the video playing layer 110, VideoWidget is passed in the video playing layer, and thus the play and control view layer 120 owns an implementation of IVideoWidget. In this case, IVideoWidget is an abstraction of the video playing layer 110. As a result, all operations of the user on the play and control view layer 120 will be called back to the video playing layer 110 through the IVideoWidget interface.

Network changes are monitored inside the video component 100, and logic corresponding to the network changes is processed by the video component 100. For example, the video component 100 further includes a network interception interface (NetworkEventProcessor) 140. The network interception interface 140 is connected to the video playing layer 110. For example, the network changes may be intercepted through the network interception interface 140, and a network type, such as NONE (0), WIFI (1), and MOLBILE (2), may be recorded at the network interception interface 141 of the video component 100. For example, when the network interception interface 140 intercepts a change in a network state, the video component 100 pops up prompt information to notify the user that the network state has changed.

The video component 100 may perform focus management. For example, a focus is a focal point. For example, an audio focus is a sound of audio that the user can hear. Since many sounds may be played simultaneously by default on an Android device, adding a focus mechanism can manage sounds in a more organized manner, thereby improving user experience. For example, a well-developed focus management layer 150 is encapsulated in the video component 100. The focus management layer 150 may be used to respond to internal videos and external audio and videos without a need for the user to manually realize this part of the logic. For example, the focus management layer 150 may include a focus interception interface (OnAudioFocusChangeListener) 151 and an internal focus interception interface (IVideoMediaEventForceListener) 152. Each of the focus interception interface 151 and the internal focus interception interface 152 is connected to the video playing layer 110. OnAudioFocusChangeListener and IVideoMediaEventForceListener belong to an AudioManager class.

For example, a focus change may be intercepted by the focus management layer 150 to enable the video component 100 to process a logic corresponding to the focus change. For example, when the focus management layer 150 intercepts that a video focus is preempted by another audio or video, the video component 100 automatically processes a pause logic.

For example, a focus source may be determined based on a business demand when a focus preemption notification is received. In a further embodiment, a third party may be intercepted by the focus interception interface 151 of the focus management layer 150. However, after a focus event is intercepted by the focus interception interface 151, the focus interception interface 151 still uses the internal focus interception interface 152 to transmit and process the focus event.

In an Android device, when the user opens the video component in a current application (APP) for playing, the developer may transmit a focus notification by invoking a requestAudioFocus method in an audio manager (AudioManager) class to indicate that the APP is going to start to play a video, and thus the remaining APPs may intercept the focus notification through OnAudioFocusChangeListener in the AudioManager class. When the focus interception interface 151 receives the focus notification, corresponding processing (e.g., pause playing audio) should be performed in the remaining APPs to avoid a situation where a plurality of sounds is played simultaneously. The AudioManager class in the Android system is suitable for focus communication between the APPs. The AudioManager class only provides an ability to transmit and intercept, but cannot know which APP has obtained the focus and what a current focus is. Therefore, the focuses may be divided into two categories: one is a system focus transmitted by a third-party APP, and another one is a focus within the current APP (e.g., a live video, an information video, voice broadcast, etc.). The AudioManager class in the focus management layer 150 may be uniformly used to transmit and intercept focus events, but a piece of identity information is transmitted along with the focus event. The identity information is used to indicate an identity of a focus transmitter. In this case, if other media within the current APP intercepts the focus event, it may be determined based on the identity information whether the focus transmitter is from the third-party APP or from an inside of the current APP, and thus a corresponding processing logic is then employed. The AudioManager class is located in an androidMedia package, which provides operations for accessing a control volume and a ringtone mode. AudioFocus is an Audio coordination mechanism introduced by Android. When several parties need to use an Audio resource, the AudioFocus mechanism can be used to coordinate the parties to improve the user experience.

For example, the internal focus interception interface 152 may be further configured to intercept a media focus type. For example, the media focus type may include a news voice (NEWS_VOICE), a live room (LIVE_ROOM), a live float window (LIVE_FLOAT_WINDOW), an IM video (IM_VIDEO), an SNS video (SNS_VIDEO), a news video list (NEWS_VIDEO_LIST), a news video detail page (NEWS_VIDEO_DETAIL_PAGE), a news video full screen (NEWS_VIDEO_FULL_SCREEN), a news video float window (NEWS_VIDEO_FLOAT_WINDOW), etc.

For example, the video component 100 further includes a video click interception interface (IVideoClickListener) 160 configured to intercept a click operation on the video. The video click interception interface 160 is connected to the video playing layer 110. For example, the video component 100 further includes a video state change interception interface (IVideoStateChangeListener) 170 configured to intercept a video state. For example, the video state may include an idle (IDLE) state, a playing (PLAYING) state, a paused (PAUSED) state, a loading (LOADING) state, a stopped (STOPED) state, an error (ERROR) state, and the like. The video state change interception interface 170 is connected to the video playing layer 110. For example, the video component 100 further includes a video UI configuration class 181 configured to configure a UI interface. For example, the video component 100 further includes a video configuration class 182 configured to configure a video configuration item. For example, the video component 100 further includes a video data class (VideoData) 191 and a video data management class (VideoDataManager) 192 that are configured to store and manage video data, respectively. The video data management class 192 may be further configured to manage video definition. For example, the video definition includes FLU, SD, HD, FHD, 2K, 4K, 8K, etc. A screen resolution of 480p or 576p is called Standard Definition (SD). A screen resolution of 720p is called High Definition (HD). A screen resolution of 1080p is called Full High Definition (FHD). 4k is called Ultra High Definition (UHD) or 4k UHD. 8k is called Full Ultra High Definition (FUND) or 8k UHD. For example, the user may also customize the play and control view layer 120 of the video. For instance, in play and control views for mode 3 and mode 4, a button at a right upper corner may be imported by the user. For example, the video component 100 provides complete encapsulation of the UI and functions. The encapsulated UI and functions include a small window, a full screen, focus processing logics, and the like.

The video component 100 further includes a small window function. Since the video component 100 has a small window playing function, the user only needs to invoke a line of codes to start small window playing. A video small window has an elegant UI and functional logics.

The video component 100 further has a full screen function. Since the video component 100 has a full screen playing function, the user does not need to write a line of codes, as long as a full screen button is provided in the play and control view layer 120. Through clicking the full screen button, a full screen mode is automatically entered, and a current video is automatically multiplexed for synchronization with a current video UI and a current video state. Since the video component 100 has the full screen playing function, a video displayed in a full screen and a video on a previous page share the same video stream, which can achieve seamless switching to the full screen.

The video component 100 may achieve video multiplexing. When the same video is being jumped, the video component 100 intelligently and automatically multiplexes the video to accomplish seamless switching between videos.

For example, a VideoPlayerManager class may be implemented in the video component 100. This class is a video stream multiplexing pool. All played videos will be saved in the video stream multiplexing pool. When a target video is prepared for playing, whether a video stream identical to the target video exists in the video stream multiplexing pool is searched. When the video stream identical to the target video exists in the video stream multiplexing pool, the video stream identical to the target video is directly acquired from the video stream multiplexing pool for video playing. For example, the video component 100 may be further configured to perform multiplexing processing. The multiplexing processing may include video multiplexing for video streams in the video stream multiplexing pool. Further, the multiplexing processing may include component multiplexing for a UI component, for example, providing the video component multiplexing pool. When a video identical to the target video to be played currently exists in the video component multiplexing pool, the entire video component may be moved and multiplexed directly. With multiplexing of the video component, the UI and the function of the video component corresponding to the target video can be directly multiplexed to achieve the seamless switching.

Figure 2:
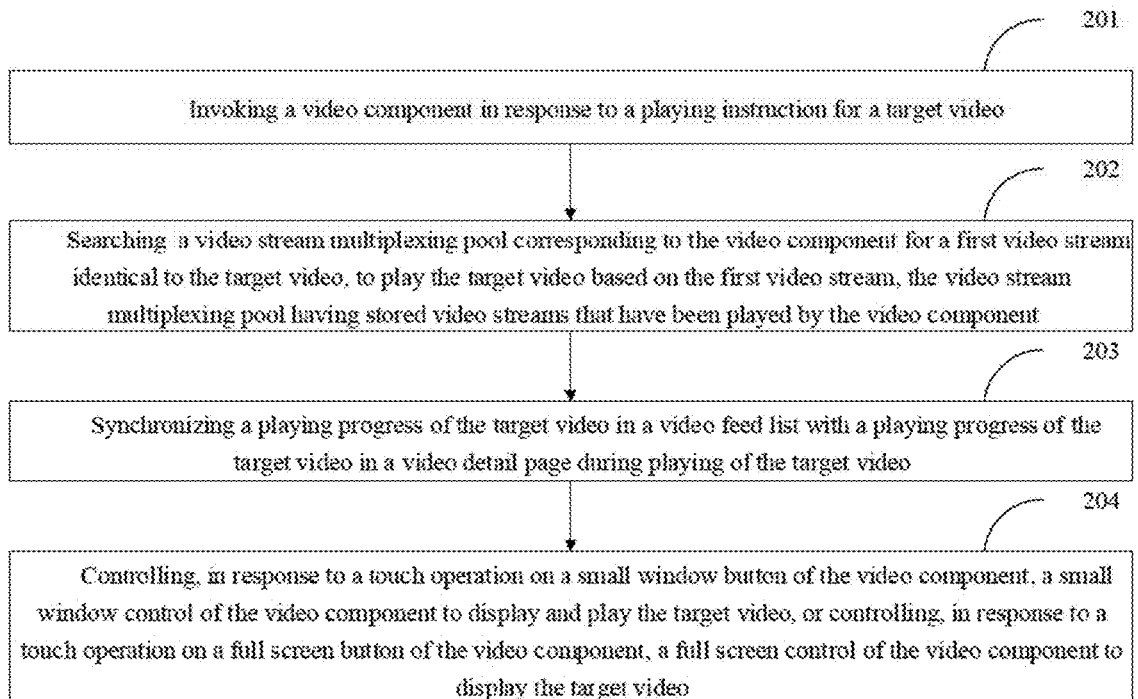
FIG. 2 is a schematic flowchart of a video playing method according to an embodiment of the present disclosure.

FIG. 2 is a schematic flowchart of a video playing method according to an embodiment of the present disclosure. Referring to FIG. 2 to FIG. 17, it should be noted that the video playing method according to the embodiments of the present disclosure can be applied in a video playing apparatus according to the embodiments of the present disclosure. The video playing apparatus may be configured on a terminal device. The terminal device may be a terminal device that has a client provided therein. The client is configured with a video component. The video component may be the video component illustrated in FIG. 1. The video playing method includes the following operations at blocks.

At block 201, the video component is invoked in response to a playing instruction for a target video.

For example, after the client is activated, a video feed list or a video detail page may be displayed on a display page of the client. The target video is carried in the video feed list or the video detail page. The user can click on the target video on the display page to trigger the playing instruction for the target video, and thus the video component is invoked to play the target video. Feed is used to combine some information sources actively subscribed by the user to form a content aggregator, helping the user to continuously access the latest content from the subscribed sources. For example, feed is a way of presenting contents to the user and continuously updating the contents. The user can choose to subscribe to several sources. A website provides a feed website address. The user registers the feed website address into a reader. An aggregation page formed in the subscribed source is a feed stream. The subscribed source includes not only a particular content but also a person and/or a group that produces the content. A subscribed content often includes non-subscribed contents, such as popular recommendations and advertisements. One feed is one unit of information, one unit of useful information that the user wants to see, or one unit of information that fulfills requirements for the user. For example, one feed is a unit of information such as a card, a paragraph of text, a video, and a piece of audio. The feed stream is a continuously updated stream of information that pushes contents from the subscribed sources to the user. The feed stream may be presented in various forms, including but not limited to a timeline-based presentation form timeline, an intelligent sorting-based presentation form rank, and so on. For timeline, contents may be displayed to the user based on a time sequence of updates of contents of the feed stream. For rank, weights of the contents of the feed stream may be calculated based on some factors to determine a display sequence of the contents of the feed stream. For example, intelligent sorting can be performed based on interests and preferences of the user.

The feed list may be a list of information that continuously scrolls down and continuously loaded. The feed list may correspond to the user. Each user logging into the client has a feed list of his/her own. Each feed entry is a separate piece of information. Operations on the feed list include, but are not limited to, clicking, scrolling down for loading, scrolling up and down for preview, and the like. Cards, texts, images, videos, audio, and the like may be displayed in the feed list.

For example, the video feed list may include a target video feed and other feeds.

For example, the video detail page may include a playing window of the target video and detail information corresponding to the target video. For example, the detail information may include comment information, a video introduction, a playing record, and the like.

In some embodiments, the invoking the video component in response to the playing instruction for the target video includes: in response to the playing instruction for the target video, adding the video component to a layout file, and transferring data of the target video to the video component in a code file, to invoke the video component.

For example, when the user uses the video component, user access may be realized by adding the video component to the layout file and transferring the data of the target video to the video component in the code file, in response to the playing instruction for the target video.

In some embodiments, a video component multiplexing pool is provided.

In some embodiments, the invoking the video component includes invoking the first video component in response to determining that a first video component exists in the video component multiplexing pool, in which the first video component corresponds to a video that is identical to the target video to be played currently.

For example, the video component may be further configured to perform multiplexing of the video component. For example, the video component multiplexing pool is provided. During the invoking of the video component, the first video component may be directly moved and multiplexed, in response to determining that the first video component that corresponds to the video that is identical to the target video to be played currently exists in the video component multiplexing pool. With the multiplexing of the video component, a UI and a function of the first video component corresponding to the target video can be directly multiplexed to achieve seamless switching.

In some embodiments, the invoking the video component includes: invoking, in response to determining that a plurality of invoked video components exists in the video component multiplexing pool, a second video component with a fastest video loading speed from the plurality of invoked video components in the video component multiplexing pool.

For example, in response to determining that the plurality of previously invoked video components exists in the video component multiplexing pool, the second video component with the fastest video loading speed is selected from the plurality of video components in the video component multiplexing pool during the invoking of the video component, to move and multiplex the second video component, through which the target video to be played currently is displayed. With the multiplexing of the video component, a UI and a function of the second video component with the fastest video loading speed can be directly multiplexed to achieve quick loading and smooth playing of the video.

In some embodiments, the video playing method further includes: determining, based on pre-divided loading blocks of different sizes in loading mediums, a loading block corresponding to target data, and temporarily storing the target data in the loading block corresponding to the target data.

In a further embodiment, this embodiment provides a data attribute-based video loading mechanism that divides blocks in each of the loading mediums and determines a suitable loading block for loading of target data. For example, the target data includes the target video.

In some embodiments, the determining, based on the pre-divided loading blocks of different sizes in the loading mediums, the loading block corresponding to the target data, and temporarily storing the target data in the loading block corresponding to the target data includes: pre-dividing the loading blocks of different sizes in each of the loading mediums, in which the loading blocks of different sizes are incremented by an incremental factor, and the incremental factor is determined based on an average expected size of the target data; determining a loading capacity of each of the loading blocks based on a minimum block capacity in the loading medium and the incremental factor; determining a total loading capacity of the loading medium based on the loading capacity of the loading block; determining, based on the total loading capacity of the loading medium, a target loading medium corresponding to the target data; and determining the loading block corresponding to the target data from a target storage medium based on a size of the target data, and temporarily storing the target data in the loading block corresponding to the target data.

In a further embodiment, a loading block corresponding to the data is determined based on the pre-divided loading blocks of different sizes in the loading mediums.

Further, the loading blocks of different sizes are divided in each of the loading mediums and are incremented based on a rule. An incremental factor A is determined based on an average expected size of loading data. It is assumed that i loading blocks exist in a loading medium, in which a minimum block capacity is Cap_X(min).

A loading capacity of an $i^{th}$ loading block is determined based on the incremental factor A and a minimum block flux as below:

$$Cap\_X(i) = A^{i-1} Cap\_X(min).$$

A total loading capacity of the loading medium, i.e., a sum of a geometric progression, is determined based on the loading capacity of each block as below:

$$Cap\_Y = \frac{Cap\_X(min) - A Cap\_X(min)_n}{1 - A}.$$

After the loading medium in which data needs to be stored is determined, a suitable loading block is determined in the storage medium based on a size of the data, and the data is temporarily stored in the corresponding loading block. When it is required to invoke desired loading data, the loading data is invoked based on a principle of time and memory optimization to effectively manage a loading space, improving a loading speed.

In some embodiments, the target data includes the target video. The video playing method further includes: loading, in response to playing the target video, the target video from one of the loading blocks corresponding to the target video.

In some embodiments, the invoking the video component includes: invoking, in response to determining that a plurality of invoked video components exists in the video component multiplexing pool, a third video component with a lowest Central Processing Unit (CPU) occupancy and/or a lowest memory occupancy from the plurality of invoked video components in the video component multiplexing pool.

For example, in response to determining that the plurality of previously invoked video components exists in the video component multiplexing pool, the third video component with the lowest CPU occupancy and/or the lowest memory occupancy is selected from the plurality of invoked video components in the video component multiplexing pool during the invoking of the video component. The third video component is moved and multiplexed to play the target video to be played currently through the third video component. With the multiplexing of the video component, a UI and a function of the third video component with the lowest CPU occupancy and/or the lowest memory occupancy can be directly multiplexed, which can reduce impact on an operation speed of the terminal device during the operation of the video component.

At block 202, a video stream multiplexing pool corresponding to the video component is searched for a first video stream identical to the target video, to play the target video based on the first video stream. The video stream multiplexing pool has stored thereon video streams that have been played by the video component.

In some embodiments, the searching the video stream multiplexing pool corresponding to the video component for the first video stream identical to the target video, to play the target video based on the first video stream includes: searching the video stream multiplexing pool corresponding to the video component to determine whether the first video stream identical to the target video exists in the video stream multiplexing pool corresponding to the video component; obtaining the first video stream to play, based on the first video stream, the target video, in response to determining that the first video stream identical to the target video exists in the video stream multiplexing pool; or loading a second video stream corresponding to the target video to play, based on the second video stream, the target video, in response to determining that no first video stream identical to the target video exists in the video stream multiplexing pool.

The video component can achieve video multiplexing. When the same video is jumped, the video component may intelligently and automatically multiplex the video to accomplish seamless switching between videos. For example, the VideoPlayerManager class may be implemented in the video component. This class is the video stream multiplexing pool. The video stream multiplexing pool may be one of data classes in a video data class 191 in FIG. 1, or be a data class corresponding to the client. All played videos will be saved in the video stream multiplexing pool. When the target video is prepared for playing, whether the first video stream identical to the target video exists in the video stream multiplexing pool is searched. In response to determining that the first video stream identical to the target video exists in the video stream multiplexing pool, the first video stream identical to the target video is acquired directly from the video stream multiplexing pool for video playing. In response to determining that no first video stream identical to the target video exists in the video stream multiplexing pool, the second video stream corresponding to the target video is loaded. For example, the second video stream corresponding to the target video is loaded from a cloud memory or a specified database to play the target video based on the second video stream.

For example, the user plays a video A. In this case, the user accesses the video detail page in response to clicking on the video A. When the video A in the video detail page starts playing, whether a video stream a identical to the video A exists in the VideoPlayerManager class is firstly found out. When the video stream a identical to the video A exists in the VideoPlayerManager class, the video stream a is taken out directly from the VideoPlayerManager class and played without recreating a video stream.

In some embodiments, the video component includes a focus management layer. The video playing method further includes, prior to playing the target video: transmitting, by means of the focus management layer, a target focus notification corresponding to the target video and identity information corresponding to the target focus notification to another video component, in which the target focus notification being used to instruct, in response to a focus preemption, the another video component to release a focus; and controlling the video component to play the target video, in response to monitoring, by means of the focus management layer, a release of the focus transmitted by the other video component and identity information corresponding to the released focus.

Figure 3:
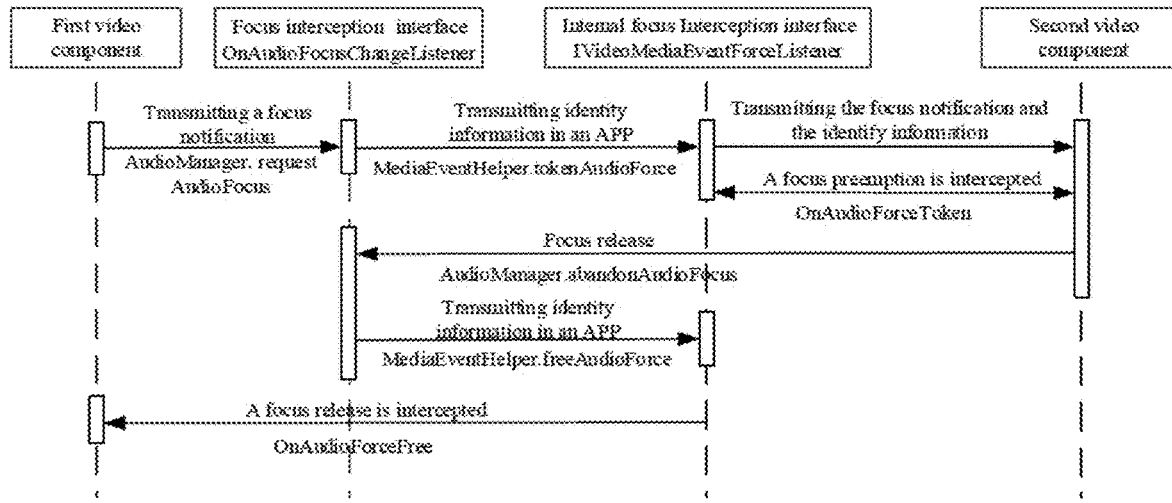
FIG. 3 is a schematic diagram of an application scenario of focus management according to an embodiment of the present disclosure.

For example, referring to FIG. 3, the first video component, a focus interception interface, and an internal focus interception interface are provided in the current APP, and the second video component is provided in another APP. In the current APP, when the user opens the first video component in the current APP to prepare to play the target video (e.g., the video A), the focus notification is transmitted by invoking the requestAudioFocus method in the audio manager class, to indicate that the current APP is going to start playing the target video. The current APP may be configured to intercept the target focus notification corresponding to the target video by invoking the focus interception interface in the AudioManager class, and transmit, via the focus interception interface, the target focus notification and the identity information corresponding to the target focus notification to the internal focus interception interface and the second video component in the another APP. The second video component in the another APP is configured to determine that the target video needs to be played currently, in response to receiving the target focus notification and the identity information corresponding to the target focus notification. When the second video component in the another APP is currently playing a video B, a focus of the target video is preempted. The focus preemption is intercepted by the internal focus interception interface. The internal focus interception interface is configured to transmit the focus notification indicating that the first video component is going to play the target video to the second video component in the another APP, to enable the second video component to release a focus corresponding to the currently playing video B. When the focus interception interface in the current APP intercepts a notification that the second video component releases the focus, the focus interception interface transmits identity information corresponding to the released focus to the internal focus interception interface, and then the internal focus interception interface transmits an intercepted release of the focus and the identity information corresponding to the released focus to the first video component, allowing the first video component to determine that a focus of the target video to be played is not preempted currently and to start playing the target video accordingly.

For example, further referring to FIG. 3, the first video component, the focus interception interface, the internal focus interception interface, and the second video component are provided in the current APP. In the current APP, when the user opens the first video component in the current APP to prepare to play the target video (e.g., a video C), the focus notification is transmitted by invoking the requestAudioFocus method in the audio manager class to indicate that the current APP is going to start playing the target video. The current APP may be configured to intercept the target focus notification corresponding to the target video by invoking the focus interception interface in the AudioManager class, and transmit, via the focus interception interface, the target focus notification and the identity information corresponding to the target focus notification to the internal focus interception interface and the second video component in the current APP. The second video component is configured to determine, in response to receiving the target focus notification and the identity information corresponding to the target focus notification, that the target video needs to be played currently. When the second video component is currently playing a video D, a focus preemption of the target video is indicated. The focus preemption is intercepted by the internal focus interception interface. The internal focus interception interface is configured to transmit the focus notification indicating that the first video component is going to play the target video to the second video component, to enable the second video component to release a focus corresponding to the currently playing video D. When the focus interception interface in the current APP intercepts a notification that the second video component releases the focus, the focus interception interface transmits identity information corresponding to the released focus to the internal focus interception interface, and then the internal focus interception interface transmits an intercepted release of the focus and the identity information corresponding to the released focus to the first video component, allowing the first video component to determine that a focus of the target video to be played is not preempted currently and to start playing the target video accordingly.

At block 203, a playing progress of the target video in a video feed list is synchronized with a playing progress of the target video in a video detail page during playing of the target video.

In some embodiments, the synchronizing the playing progress of the target video in the video feed list with the playing progress of the target video in the video detail page during the playing of the target video includes: synchronizing the playing progress of the target video in the video feed list to the video detail page, in response to jumping from the video feed list to the video detail page based on an obtained first page jumping instruction; or synchronizing the playing progress of the target video in the video detail page to the video feed list, in response to jumping from the video detail page to the video feed list based on an obtained second page jumping instruction.

The playing progress in the video feed list needs to be linked to the playing progress in the video detail page.

For example, in a Wireless Fidelity (WIFI) environment, when the user accesses the detail page from the video feed list based on the obtained first page jumping instruction, the following operations are performed.

For progress, a playing progress of a video feed needs to be synchronized to the video detail page, to realize a link between the two playing progresses.

For volume, a volume setting of the detail page may follow a volume setting of a mobile phone system.

For detail page playing paused state, business customization is supported. For example, since a community detail page may not be suitable for an auto-play function, the auto-play function may be canceled for the community detail page.

For example, in the WIFI environment, when the user returns to the video feed list from the video detail page based on the obtained second page jumping instruction, the following operations are performed.

For progress, when the video feed is still displayed on a current screen, the playing progress of the video detail page needs to be synchronized to the video feed to realize a link between the two playing progresses.

For volume, the video feed maintains a volume on/off state of an original feed.

For feed playing paused state, it can follow a system playing setting.

For example, in a traffic environment, when the user accesses the video detail page from the video feed list based on the obtained first page jumping instruction, the following operations are performed.

For progress, the playing progress of the video feed needs to be synchronized to the video detail page to realize a link between the two playing progresses.

For volume, the volume setting of the detail page may follow the volume setting of the mobile phone system.

For detail page playing paused state, the business customization is supported. For example, since the community detail page may not be suitable for the auto-play function, the auto-play function may be canceled for the community detail page.

For example, in the traffic environment, when the user returns to the video feed list from the video detail page based on the obtained second page jumping instruction, the following operations are performed.

For progress, after the video in the detail page starts playing, when the user returns to the video feed list from the detail page, the playing progress of the video detail page needs to be synchronized to the video feed to realize a link between the two playing progresses.

For volume, the video feed remains muted.

For feed playing paused state, it can follow the system playing setting.

For example, for a same video source, a playing progress synchronization is performed in all scenarios and recorded in a life cycle of the current APP.

At block 204, a small window control of the video component is controlled to display and play the target video, in response to a touch operation on a small window button of the video component, or a full screen control of the video component is controlled to display the target video, in response to a touch operation on a full screen button of the video component.

In some embodiments, the video component further includes a network interception interface. The video playing method further includes: displaying network state change prompt information on a display interface of the client, in response to the network interception interface intercepting a change in a network state.

In a case of a network change, when the video component already has a previous history playing state (i.e., a non-initialized state), the previous history playing state is maintained regardless of the current playing setting. When the network interception interface intercepts the change in the network state, i.e., a network connection is switched from a wifi network to a traffic data network, the network state change prompt information is displayed on a UI display interface of the client. For example, a traffic prompt toast is displayed. For example, a toast prompt, as a type of information frame in the Android system and a simple information prompt frame, is a mechanism used in Android to display prompt information. An idea of a Toast class is to be as unobtrusive as possible while still displaying information to the user.

In some embodiments, the controlling, in response to the touch operation on the small window button of the video component, the small window control of the video component to display and play the target video includes: when the small window control is located on the video detail page, pausing playing of a video on the video detail page and controlling the small window control to play the target video, and controlling, in response to detecting that the small window control pauses the playing of the target video or the small window control is disabled, the video on the video detail page to be automatically played when the network state is in an wireless fidelity (wifi) environment; or when the small window control is located on the video feed list, pausing playing of a video on the video feed list and controlling the small window control to play the target video, and controlling, in response to detecting that the small window control pauses the playing of the target video or the small window control is disabled, the video on the video feed list to be automatically played when the network state is in an wireless fidelity (wife) environment.

In some embodiments, the video playing method further includes, during the controlling the small window control to play the target video: controlling, in response to obtaining a live stream access request for a target live stream, the small window control to close the target video and play the target live stream.

Figure 4:
FIG. 4 is a schematic diagram of an application scenario of small window portrait playing according to an embodiment of the present disclosure.

For example, as illustrated in a schematic diagram of an application scenario for small window playing in FIG. 4, small window portrait playing can be implemented in response to controlling the small window control of the video component to display and play the target video.

Figure 5:
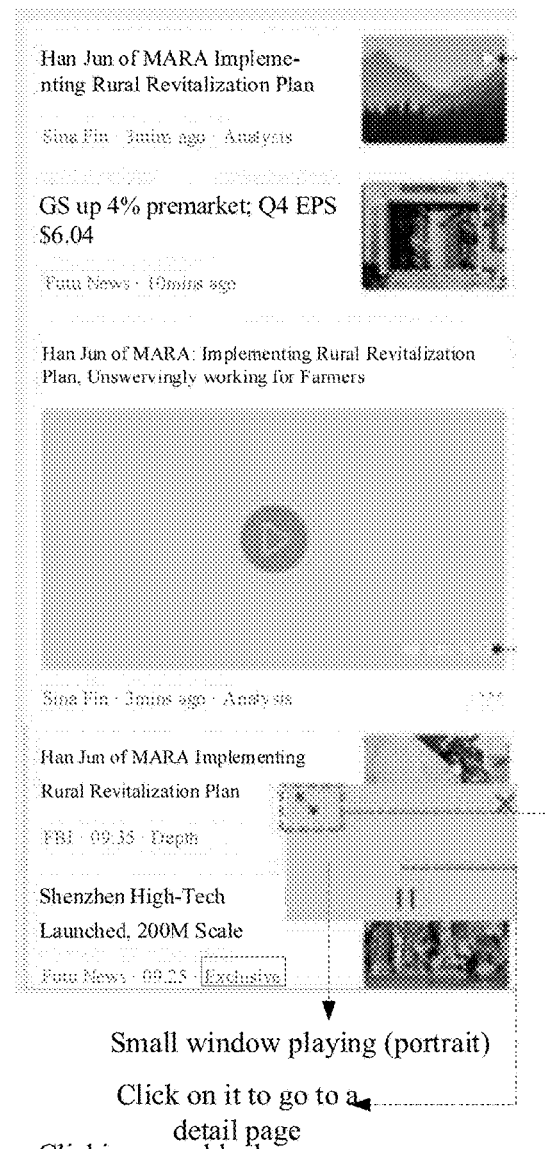
FIG. 5 is a schematic diagram of an application scenario of small window landscape playing according to an embodiment of the present disclosure.

For example, as illustrated in a schematic diagram of an application scenario for small window playing in FIG. 5, small window landscape playing can be implemented in response to controlling the small window control of the video component to display and play the target video.

For example, the small window control may be displayed on the video detail page in a floating layer manner. A jump icon on the small window control may be clicked to jump from the small window control to the video detail page. Furthermore, a blank space on the small window control may be clicked to invoke or hide the small window control.

Figure 6:
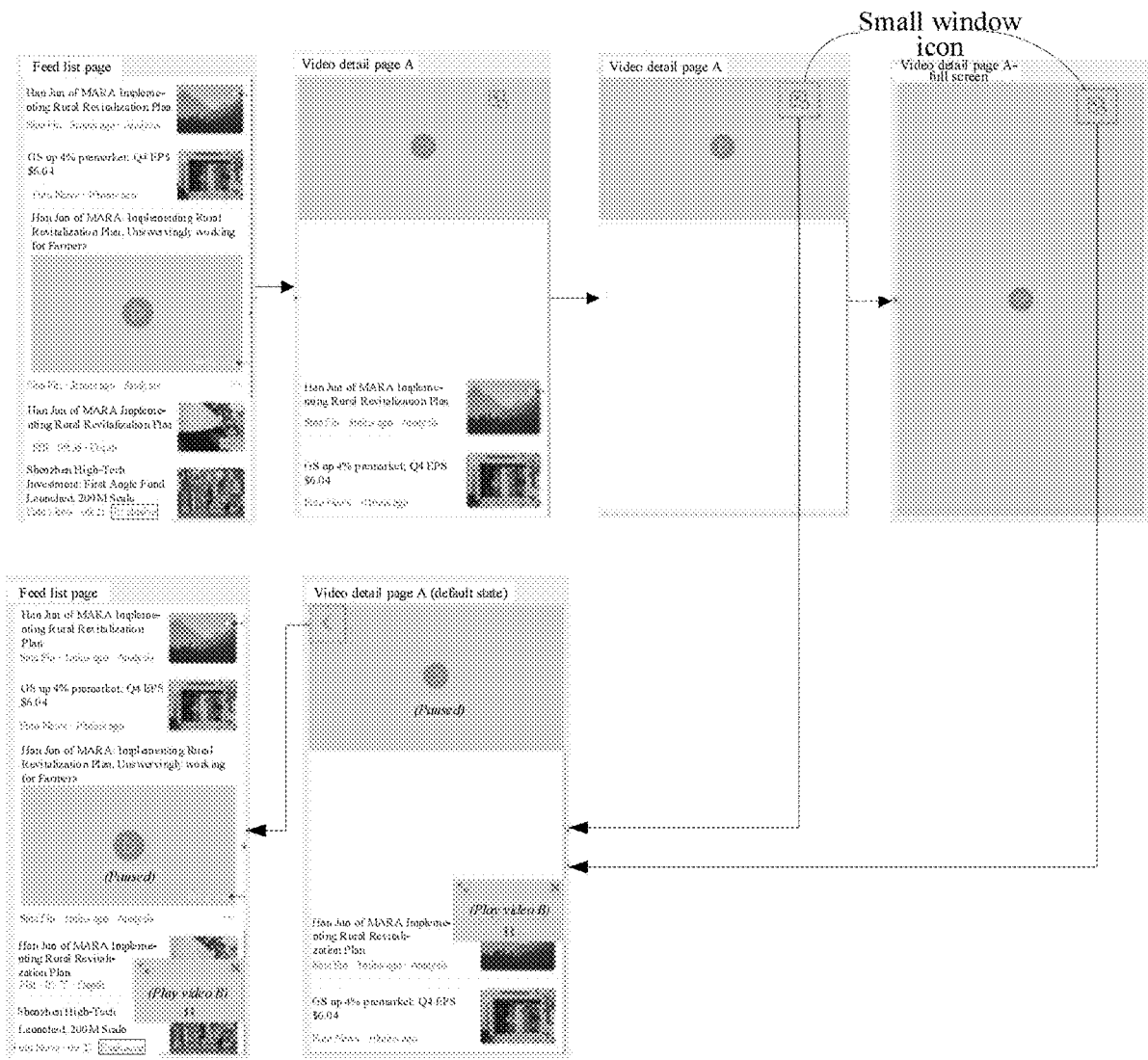
FIG. 6 is a schematic diagram of an interaction scenario of small window playing according to an embodiment of the present disclosure.

For example, as illustrated in a schematic diagram of an interaction scenario for small window playing in FIG. 6, the small window may include clicking the small window button (icon) and scenarios after opening the small window.

(1) Clicking the small window button (icon), which includes the following cases.

Clicking the small window icon in the video detail page: go back to a previous page.

Clicking the small window icon in the full screen: close the current video detail page and go back to a previous page.

(2) Scenarios after opening the small window, which include the following cases.

a. In a case where the returned previous page is the video detail page, a playing state of a small window video and a playing state of the video on the detail page should be mutually exclusive. Only one of the small window video and the video on the detail page is allowed to be played, while another one of the small window video and the video on the detail page is paused. The current video on the detail page is paused by default, and only the small window video is played. That is, playing of the video on the video detail page is paused and the small window control is controlled to play the target video. When the small window playing is paused or after the small window is closed, the video on the current detail page plays automatically in the wifi environment.

For example, as illustrated in FIG. 6, when the returned previous page is a video detail page A, a video currently displayed on the video detail page A is paused by default, and only a video B displayed in the small window is played. The small window video supports controlling playing and pause, while a live small window supports no pause. When the small window playing is paused or after the small window is closed, the video on the current detail page plays automatically in the wifi environment.

b. In a case where the returned previous page is the feed list page, a playing state of the small window video and a playing state of the video on the feed list should be mutually exclusive. Only one of the small window video and the video on the feed list is allowed to be played, while another one of the small window video and the video on the feed list is paused. The current video on the feed list is paused by default, and only the small window video is played. That is, playing of the video on the video detail page is paused and the small window control is controlled to play the target video. When the small window playing is paused or after the small window is closed, the video on the current feed list plays automatically in the wifi environment.

For example, as illustrated in FIG. 6, when the returned previous page is a feed list page, a video currently displayed on the feed list page is paused by default, and only the video B displayed in the small window is played. When the video on the small window is playing, the video feed list plays no video automatically. When the small window playing is paused or after the small window is closed, the video on the current detail page resumes automatic playing in the wifi environment.

c. In other cases, when a small window video currently exists, the small window video is closed when entering a live room. When the full screen is switched back to the video detail page, the original small window voice, the original small window video, or the original small window live broadcasting needs to be retained. When a small window video (a video content of which is A) currently exists and the video detail page A is opened in another scenario outside the small window, the small window video A needs to be closed in the video details page A. The current detail page is closed by clicking the small window icon on the video detail page A, and a small window A' is opened.

Focus relations among broadcasting methods, such as a video feed, a small window video, small window live broadcast, and voice broadcast, include the following cases.

For the small window video and the small window live broadcast, a small window is shared, and two small windows will not exist simultaneously.

For the small window and the voice broadcast, a latest opened content is played by default.

Mutual exclusions between playing states c can be found in the following table:

| Video feed | Small window video | Small window live broadcast | Voice broadcast |
| --- | --- | --- | --- |
| manual playing | paused | closed | paused |
| paused | playing | \ | paused |
| paused | \ | playing | paused |
| paused | paused | closed | manual playing |

Figure 7:
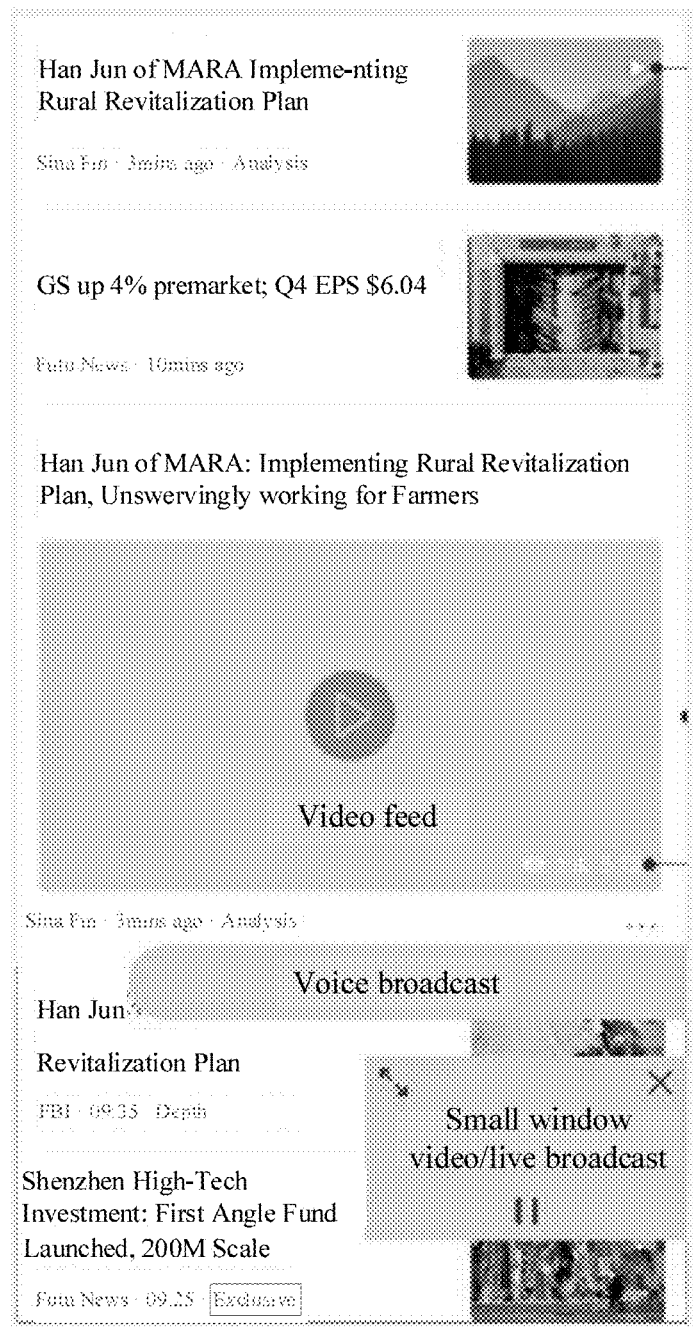
FIG. 7 is a schematic diagram of an application scenario of a playing method according to an embodiment of the present disclosure.

For example, as illustrated in a schematic diagram of an application scenario in FIG. 7, example display of the broadcasting methods, such as the video feed, the small window video/live broadcast, and the voice broadcast, is illustrated in the diagram. The video feed is currently in a paused state. The small window video/live broadcast is currently in a playing state. The voice broadcast is currently in a paused state.

When the user accesses the video feed list in a playing state of the voice broadcast, the video needs to be played on mute. When the video is played on mute, the voice broadcast will not be interrupted. Only when the video is switched to audible playing, the voice broadcast will be interrupted.

For example, the video component may support four modes: mode 1 that supports a non-immersive state (e.g., applied to a community feed list); mode 2 that does not support a non-immersive state (e.g., applied to an information feed list); mode 3 (e.g., applied to a default screen on the detail page); and mode 4 (e.g., applied to a full screen on the detail page).

Figure 8:
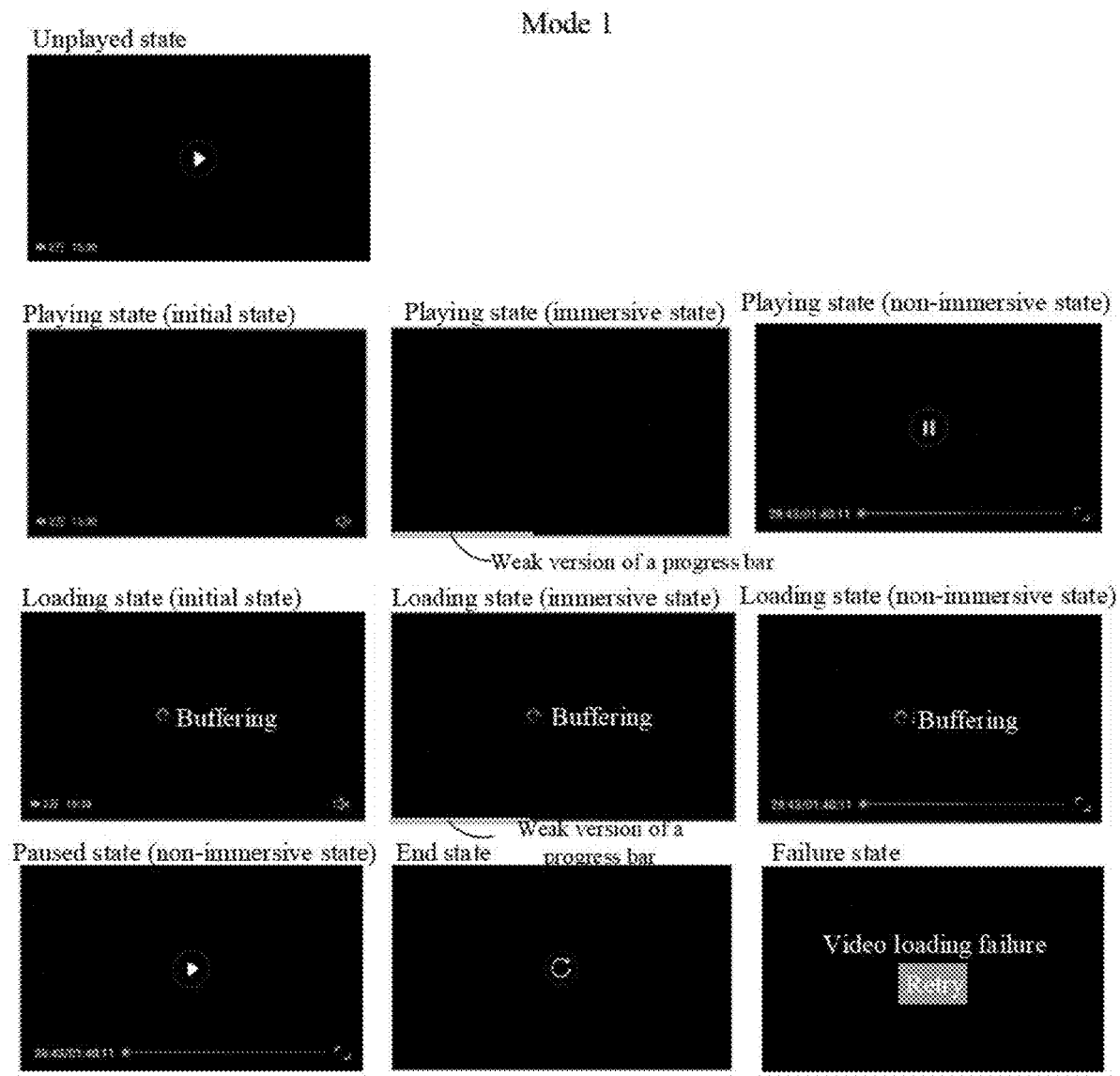
FIG. 8 is a schematic diagram of an application scenario of mode 1 according to an embodiment of the present disclosure.

For example, in mode 1 that supports the non-immersive state (e.g., applied to the community feed list), performance of the video component in various states are referred to a diagram of an application scenario of mode 1 illustrated in FIG. 8 and a table of component specification information of mode 1 illustrated in FIG. 9. For example, in an unplayed state, a triangular play button, a video duration, and an amount of followers or view counts of the video are displayed on a play window of the video component. In an initial state of the playing state, neither a playing progress nor a temporary button may be displayed on the play window of the video component, while only the video duration and the number of followers or view counts of the video are displayed. A volume switch may also be displayed. In an immersive state of the playing state, a video screen may be displayed on the play window of the video component in a full window. In addition, a weak version of a progress bar may be displayed at a bottom of the video screen in the full window in the immersive state. The weak version of the progress bar may be represented as a tinted line different from a display color of the video screen. A total length of the weak version of the progress bar is equal to a length of a long side of the video screen in the full window. A display length of the weak version of the video progress bar is determined based on a ratio between a currently played video duration and a total duration of the video. In the non-immersive state of the playing state, a pause button, a video duration, a playing progress (progress bar, progress duration, etc.), a full screen button, and the like may be displayed on the play window of the video component. In an initial state of a loading state, the play window of the video component may display the video duration, the amount of followers or view counts of the video, the volume switch, and a loading identifier of "buffering". In an immersive state of the loading state, the video screen may be displayed on the play window of the video component in the full window. In addition, in the immersive state, the weak version of the progress bar may be displayed at the bottom of the video screen in the full window, and the loading identifier of "buffering" may be displayed. In a non-immersive state of the loading state, the play window of the video component may display the video duration, the playing progress (progress bar, progress duration, etc.), the full screen button, and the like, and the loading identifier of "buffering" may be displayed. In a non-immersive state of a paused state, a play button, the video duration, the playing progress (progress bar, progress duration, etc.), the full screen button, and the like may be displayed on the play window of the video component. In an end state, a replay button may be displayed on the play window of the video component. In a failure state, a loading failure prompt and a retry button may be displayed on the play window of the video component.

For example, in mode 2 that does not support the non-immersive state (e.g., applied to the information feed list), performance of the video component in various states may be referred to a diagram of an application scenario of mode 2 illustrated in FIG. 10 and a table of component specification information of mode 2 illustrated in FIG. 11. For example, in an unplayed state, a triangular play button, a video duration, and the number of followers or view counts of the video are displayed on a play window of the video component. In an initial state of the playing state, neither a playing progress nor a temporary button may be displayed on the play window of the video component, while only the video duration and the number of followers or view counts of the video are displayed. A volume switch may also be displayed. In an immersive state of the playing state, a video screen may be displayed on the play window of the video component in a full window. In addition, a weak version of a progress bar may be displayed at a bottom of the video screen in the full window in the immersive state. In the initial state of the loading state, a play window of the video component may display the video duration, the number of followers or view counts of the video, the volume switch, and the loading identifier of "buffering". In the immersive state of the loading state, the video screen in the full window and the loading identifier of "buffering" may be displayed on the play window of the video component. In mode 2, the paused state does not exist. In the failure state, the loading failure prompt and the retry button may be displayed on the play window of the video component.

Figure 12:
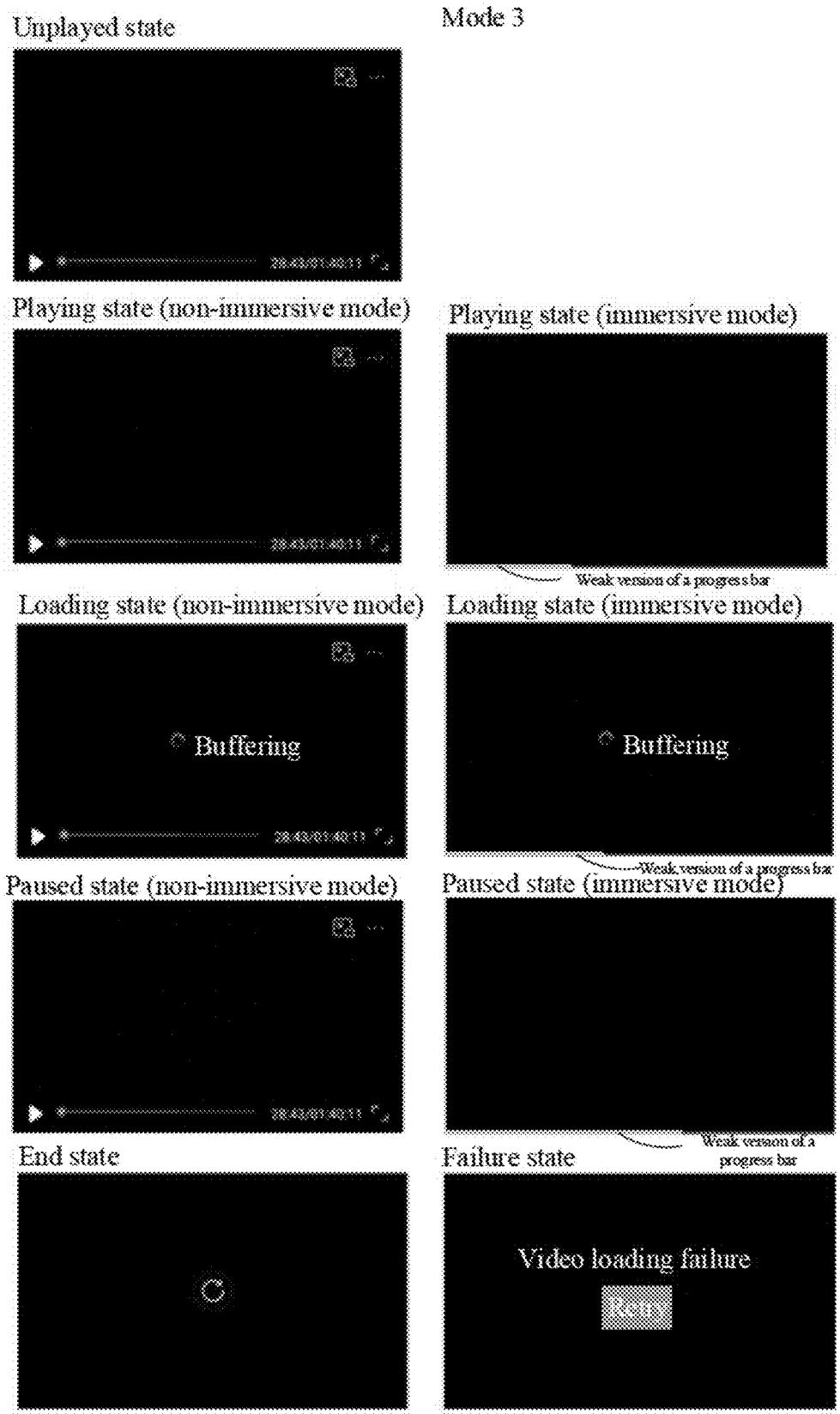
FIG. 12 is a schematic diagram of an application scenario of mode 3 according to an embodiment of the present disclosure.

For example, in mode 3 (e.g., applied to the default screen on the detail page), performance of the video component in various states may be referred to a diagram of an application scenario of mode 3 illustrated in FIG. 12 and a table of component specification information of mode 3 illustrated in FIG. 13. For example, in the unplayed state, the triangular play button, the video duration, the playing progress (progress bar, progress duration, etc.), the full screen button, and the like are displayed on the play window of the video component. In the non-immersive state of the playing state, the play button, the video duration, the playing progress (progress bar, progress duration, etc.), the full screen button, and the like may be displayed on the play window of the video component, and an identifier used to indicate "more" may be displayed in an upper right corner. In the immersive state of the playing state, the video screen may be displayed on the play window of the video component in the full window. In addition, the weak version of the progress bar may be displayed at the bottom of the video screen in the full window in the immersive state. In the non-immersive state of the loading state, the play button, the video duration, the playing progress (progress bar, progress duration, etc.), the full screen button, and the like may be displayed on the play window of the video component, and the identifier used to indicate "more" may be displayed in the upper right corner. Also, the loading identifier of "buffering" may be displayed. In the immersive state of the loading state, the video screen may be displayed on the play window of the video component in the full window. In addition, in the immersive state, the weak version of the progress bar may be displayed at the bottom of the video screen in the full window, and the loading identifier of "buffering" may be displayed. In the non-immersive state of the paused state, the play button, the video duration, the playing progress (progress bar, progress duration, etc.), the full screen button, and the like may be displayed on the play window of the video component, and the identifier used to indicate "more" may be displayed in the upper right corner. In an immersive state of the paused state, the video screen may be displayed on the play window of the video component in the full window. In addition, in the immersive state, the weak version of the progress bar may be displayed at the bottom of the video screen in the full window. In the end state, the replay button may be displayed on the play window of the video component. In the failure state, the loading failure prompt and the retry button may be displayed on the play window of the video component.

For example, in mode 4 (e.g., applied to the full screen on the detail page), performance of the video component in various states may be referred to a diagram of an application scenario of mode 4 illustrated in FIG. 14 and a table of component specification information of mode 4 illustrated in FIG. 15. For example, in the unplayed state, the triangular play button, the video duration, the playing progress (progress bar, progress duration, etc.), the full screen button, and the like are displayed on the play window of the video component. In the non-immersive state of the playing state, the play button, the video duration, the playing progress (progress bar, progress duration, etc.), the full screen button, and the like may be displayed on the play window of the video component, and the identifier used to indicate "more" may be displayed in the upper right corner. In the immersive state of the playing state, the video screen may be displayed on the play window of the video component in the full window. In addition, the weak version of the progress bar may be displayed at the bottom of the video screen in the full window in the immersive state. In the non-immersive state of the loading state, the play button, the video duration, the playing progress (progress bar, progress duration, etc.), the full screen button, and the like may be displayed on the play window of the video component, and the identifier used to indicate "more" may be displayed in the upper right corner. Also, the loading identifier of "buffering" may be displayed. In the immersive state of the loading state, the video screen may be displayed on the play window of the video component in the full window. In addition, in the immersive state, the weak version of the progress bar may be displayed at the bottom of the video screen in the full window, and the loading identifier of "buffering" may be displayed. In the non-immersive state of the paused state, the play button, the video duration, the playing progress (progress bar, progress duration, etc.), the full screen button, and the like may be displayed on the play window of the video component, and the identifier used to indicate "more" may be displayed in the upper right corner. In the immersive state of the paused state, the video screen may be displayed on the play window of the video component in the full window. In addition, in the immersive state, the weak version of the progress bar may be displayed at the bottom of the video screen in the full window. In the end state, the replay button may be displayed on the play window of the video component. In the failure state, the loading failure prompt and the retry button may be displayed on the play window of the video component. In mode 4, a gravity sensor is configured to support sensing an automatic full screen or returning to the default screen.

For example, regarding a small window function for a video, performance of the video component in various stated may be referred to a diagram of an application scenario of a small window mode illustrated in FIG. 16 and a table of component specification information of a small window mode illustrated in FIG. 17. For example, in the non-immersive state of the playing state, the pause button, the full screen button, a close button, and the like may be displayed on the play window of the video component. In the immersive state of the playing state, the video screen may be displayed on the play window of the video component in the full window. In addition, the weak version of the progress bar may be displayed at the bottom of the video screen in the full window in the immersive state. In the non-immersive state of the loading state, the pause button, the full screen button, the close button, and the like may be displayed on the play window of the video component, and the loading identifier of "buffering" may be displayed. In the immersive state of the loading state, the video screen may be displayed on the play window of the video component in the full window. In addition, in the immersive state, the weak version of the progress bar may be displayed at the bottom of the video screen in the full window, and the loading identifier of "buffering" may be displayed. In the non-immersive state of the paused state, the play button, the full screen button, the close button, and the like may be displayed on the play window of the video component, and the identifier used to indicate "more" may be displayed in the upper right corner. In the immersive state of the paused state, the video screen may be displayed on the play window of the video component in the full window. In addition, in the immersive state, the weak version of the progress bar may be displayed at the bottom of the video screen in the full window. In the end state, the replay button may be displayed on the play window of the video component. In the failure state, the loading failure prompt and the retry button may be displayed on the play window of the video component.

Regarding mode 1, mode 2, mode 3, mode 4, and the small window mode, the buttons, the progress bar, a control, and the like on the video component may be configured with a visibility demand and a display demand based on actual needs of a product. For example, a specific content may be referred to the table of component specification information corresponding to each of the modes.

For example, the full screen control of the video component is controlled, in response to the touch operation (a comparison and click operation) on the full screen button of the video component, to display the target video. When the target video is displayed and played on the full screen control of the video component, a video on the video detail page or the video feed list is paused. When the user clicks on the full screen button displayed on the small window control, the small window video is switched to the full screen video.

In some embodiments, the video playing method further includes: when the video component is controlled to access a background, pausing the target video that is playing currently; and when the video component is invoked back to a foreground, re-determining, based on a current network state, a video playing setup item, and a historical video playing state when the video component accesses the background, a current playing state of the target video.

When the video component accesses the background during playing of a video, the target video playing currently is paused. When the video component is invoked back to the foreground again, the current playing state of the target video is re-determined based on a current network state, a video playing setup item, and a historical video playing state when the video component accesses the background.

A type of the video playing setup item supports a single option. For example, the options may be set as "start auto-play," "auto-play only under WIFI/traffic free," "close auto-play," and the like. At a right side of the setup item, a current effective option may be displayed in a reverse display manner. For example, when the setup item is "start auto-play," the video feed and the video detail page may be both played automatically under a normal network environment. For example, when the setup item is "auto-play only under WIFI/traffic free," the video feed and the detail page will be played automatically only under the WIFI only/traffic free environment. Otherwise, the video feed and the detail page will be displayed in a to-be-played state, and need to be manually clicked for playing. For example, when the setup item is "close auto-play," under the normal network environment, the video feed and the detail page cannot be played automatically and need to be manually clicked for playing. For example, a default state of the setup item may be "auto-play only under WIFI/traffic free." The setup item may also be cloud synchronized. For example, an interface may be opened for invoking by external business to support a customized business-based selection of whether auto-play is required.

For example, taking adaptation of a tablet computer (Pad) as an example, adaptation in a landscape mode may be as follows.

Open the video detail page on a right side: a video is played on a right side page, and the video feed of a left side list stops playing.

Close the video detail page on the right side: the video feed on the left side list resumes automatic playing, and a video progress on a detail page on the right side needs to be synchronized.

For example, when the current network state is the wifi environment, the current video playing setup item is the auto-play only under WIFI/traffic free, and the historical video playing state is playing in progress and the playing progress is at 1 minute 30 seconds (a total video length is five minutes) when the video component accesses the background. When the video component is invoked back to the frontground, automatic playing of the target video continues.

In some embodiments, the video playing method further includes: clearing a video stream corresponding to the target video, in response to the target video that is currently playing being closed and the target video being a last video stream in the video stream multiplexing pool.

For example, since the video streams are relatively memory-intensive, they need to be cleaned at an appropriate cleanup timing. For example, whether the current video is a last video in the video stream multiplexing pool is determined when the current video is closed. When the the current video is the last video in the video stream multiplexing pool, a video stream corresponding to the current video is cleaned.

All of the above technical solutions may be arbitrarily combined to form an optional embodiment of the present disclosure, which will not be repeated herein.

The embodiments of the present disclosure are applied in the client provided with the video component. The video component is invoked in response to the playing instruction for the target video. The video stream multiplexing pool corresponding to the video component is searched for the first video stream identical to the target video, to play the target video based on the first video stream. The video stream multiplexing pool has stored thereon video streams that have been played by the video component. The playing progress of the target video in the video feed list is synchronized with the playing progress of the target video in the video detail page during playing of the target video. The small window control of the video component is controlled to display and play the target video, in response to a touch operation on the small window button of the video component, or the full screen control of the video component is controlled to display the target video, in response to a touch operation on the full screen button of the video component. According to the embodiments of the present disclosure, the video component invoked directly based on the playing instruction can realize the video multiplexing. Furthermore, the small window function and the full screen function are encapsulated in the video component, which improves the function diversity of the video component. In addition, a user can perform small window playing or full screen playing by simply clicking the small window button or the full screen button, which reduces the operation complexity and improves convenience of the user in using the video component.

Figure 18:
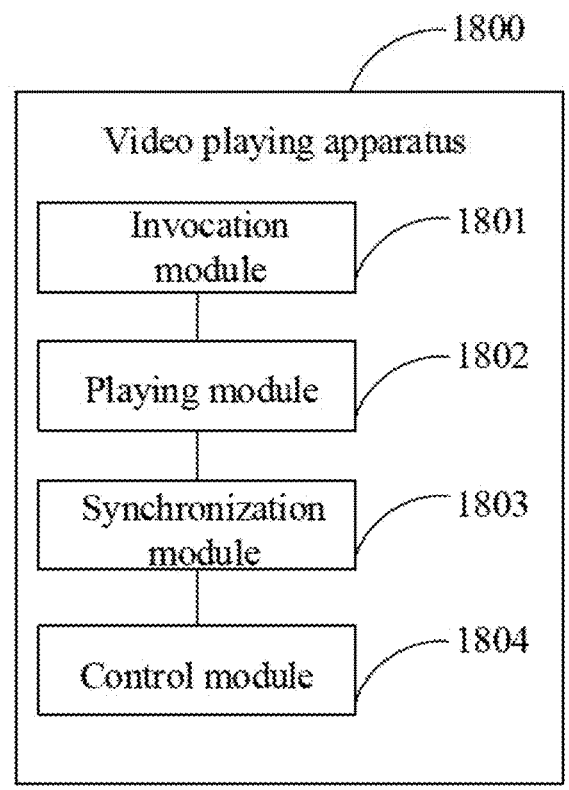
FIG. 18 is a schematic structural diagram of a video playing apparatus according to an embodiment of the present disclosure.

To better implement the video playing method according to the embodiments of the present disclosure, the embodiments of the present disclosure further provide the video playing apparatus. FIG. 18 is a schematic structural diagram of a video playing apparatus according to an embodiment of the present disclosure. Referring to FIG. 18, a video playing apparatus 1800 is applied in the client provided with the video component. The video playing apparatus 1800 may include an invocation module 1801, a playing module 1802, a synchronization module 1803, and a control module 1804.

The invocation module 1801 is configured to invoke the video component in response to a playing instruction for a target video. The playing module 1802 is configured to search a video stream multiplexing pool corresponding to the video component for a first video stream identical to the target video, to play the target video based on the first video stream. The video stream multiplexing pool has stored thereon video streams that have been played by the video component. The synchronization module 1803 is configured to synchronize a playing progress of the target video in a video feed list with a playing progress of the target video in a video detail page during playing of the target video. The control module 1804 is configured to control, in response to a touch operation on a small window button of the video component, a small window control of the video component to display and play the target video, or control, in response to a touch operation on a full screen button of the video component, a full screen control of the video component to display the target video.

In some embodiments, the playing module 1802 is configured to: searching the video stream multiplexing pool corresponding to the video component to determine whether the first video stream identical to the target video exists in the video stream multiplexing pool corresponding to the video component; obtaining the first video stream to play, based on the first video stream, the target video, in response to determining that the first video stream identical to the target video exists in the video stream multiplexing pool; or loading a second video stream corresponding to the target video to play, based on the second video stream, the target video, in response to determining that no first video stream identical to the target video exists in the video stream multiplexing pool.

In some embodiments, the video component further includes a focus management layer. The playing module 1802 is further configured, prior to playing the target video: transmit, by means of the focus management layer, a target focus notification corresponding to the target video and identity information corresponding to the target focus notification to another video component, in which the target focus notification is used to instruct, in response to a focus preemption, the another video component to release a focus; and control the video component to play the target video, in response to monitoring, by means of the focus management layer, a release of the focus transmitted by the other video component and identity information corresponding to the released focus.

In some embodiments, the synchronization module 1803 is configured to: synchronize the playing progress of the target video in the video feed list to the video detail page, in response to jumping from the video feed list to the video detail page based on an obtained first page jumping instruction; or synchronize the playing progress of the target video in the video detail page to the video feed list, in response to jumping from the video detail page to the video feed list based on an obtained second page jumping instruction.

In some embodiments, the video component further includes a network interception interface. The control module 1804 is configured to: display, in response to the network interception interface intercepting a change in a network state, prompt information of the change in the network state on a display interface of the client.

In some embodiments, the control module 1804 is configured to control, in response to the touch operation for the small window button on the video component, the small window control of the video component to display and play the target video, which includes: when the small window control is located on the video detail page, pausing playing of a video on the video detail page and controlling the small window control to play the target video, and controlling, in response to detecting that the small window control pauses the playing of the target video or the small window control is disabled, the video on the video detail page to be automatically played when the network state is in an wireless fidelity (wifi) environment; or when the small window control is located on the video feed list, pausing playing of a video on the video feed list and controlling the small window control to play the target video, and controlling, in response to detecting that the small window control pauses the playing of the target video or the small window control is disabled, the video on the video feed list to be automatically played when the network state is in an wireless fidelity (wifi) environment.

In some embodiments, the control module 1804 is configured to control, in response to obtaining a live stream entry request for a target live stream, the small window control to turn off the target video and to play the target live stream, during the controlling the small window control to play the target video.

In some embodiments, when the small window control is located on the video detail page, the control module 1804 is further configured to: display the small window control on the video detail page in a floating layer manner; jump from the small window control to the video detail page in response to a touch operation on a jump icon on the small window control; and invoking or hiding the small window control in response to a touch operation on a blank space of the small window control.

In some embodiments, the control module 1804 is further configured to: when the video component is controlled to access a background, paus the target video that is playing currently; and when the video component is invoked back to a foreground, re-determine, based on a current network state, a video playing setup item, and a historical video playing state when the video component accesses the background, a current playing state of the target video.

In some embodiments, the video playing apparatus 1800 is further configured to provide a video component multiplexing pool.

In some embodiments, the invocation module 1801 is configured to invoke the first video component in response to determining that a first video component exists in the video component multiplexing pool, in which the first video component corresponds to a video that is identical to the target video to be played currently.

In some embodiments, the invocation module 1801 is configured to invoke, in response to determining that a plurality of invoked video components exists in the video component multiplexing pool, a second video component with a fastest video loading speed from the plurality of invoked video components in the video component multiplexing pool.

In some embodiments, the invocation module 1801 is configured to invoke, in response to determining that a plurality of invoked video components exists in the video component multiplexing pool, a third video component with a lowest Central Processing Unit (CPU) occupancy and/or a lowest memory occupancy from the plurality of invoked video components in the video component multiplexing pool.

In some embodiments, the video playing apparatus 1800 is further configured to determine, based on pre-divided loading blocks of different sizes in loading mediums, a loading block corresponding to target data, and temporarily store the target data in the loading block corresponding to the target data.

In some embodiments, the video playing apparatus 1800 is specifically configured to, when determining, based on the pre-divided loading blocks of different sizes in the loading mediums, the loading block corresponding to the target data, and temporarily storing the target data in the loading block corresponding to the target data: pre-divide the loading blocks of different sizes in each of the loading mediums, in which the loading blocks of different sizes is incremented by an incremental factor, and the incremental factor is determined based on an average expected size of the target data; determine a loading capacity of each of the loading blocks based on a minimum block capacity in the loading medium and the incremental factor; determine a total loading capacity of the loading medium based on the loading capacity of the loading block; determining, based on the total loading capacity of the loading medium, a target loading medium corresponding to the target data; and determine the loading block corresponding to the target data from a target storage medium based on a size of the target data, and temporarily store the target data in the loading block corresponding to the target data.

In some embodiments, the target data includes the target video. The playing module 1802 is further configured to load, in response to playing the target video, the target video from one of the loading blocks corresponding to the target video.

In some embodiments, the invocation module 1801 is configured to: in response to the playing instruction for the target video, add the video component to a layout file, and transfer data of the target video to the video component in a code file, to invoke the video component.

In some embodiments, the control module 1804 is further configured to: clear a video stream corresponding to the target video, in response to the target video that is currently playing being closed and the target video being a last video stream in the video stream multiplexing pool.

All of the above technical solutions may be arbitrarily combined to form an optional embodiment of the present disclosure, which will not be repeated herein.

It should be understood that the apparatus embodiments and the method embodiments may correspond to each other, and similar descriptions may refer to the method embodiments. To avoid duplication, the description will not be repeated herein. In an exemplary embodiment of the present disclosure, the apparatus illustrated in FIG. 5 may perform the video playing method of the above embodiments, and the foregoing and other operations and/or functions of each of the units in the apparatus respectively implement the corresponding process of the above method embodiments, which will not be repeated herein for simplicity.

Figure 19:
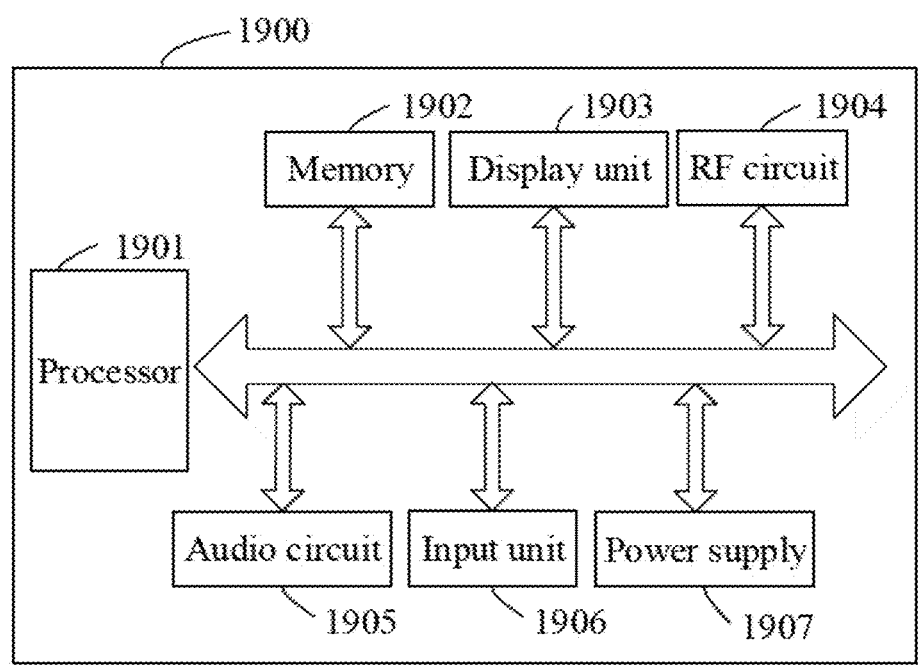
FIG. 19 is a schematic structural diagram of a terminal device according to an embodiment of the present disclosure.

Accordingly, the embodiments of the present disclosure further provide a terminal device. The terminal device may be a terminal or a server. FIG. 19 is a schematic structural diagram of a terminal device according to an embodiment of the present disclosure. As illustrated in FIG. 19, the terminal device 1900 includes a processor 1901 having at least one processing core, a memory 1902 having at least one computer-readable storage media, and computer programs stored on the memory 1902 and executable by the processor. The processor 1901 is electrically connected to the memory 1902. Those skilled in the art will appreciate that the terminal device structure illustrated in the drawing does not constitute limitation to the terminal device, and may include more or fewer components than illustrated, combination of some of the components, or different arrangements of the components.

The processor 1901 is a control center of the terminal device 1900, which uses various interfaces and lines to connect various components of the entire terminal device 1900. The processor 1901 runs or loads software programs and/or modules stored in the memory 1902 and invokes data stored in the memory 1902, to perform various functions of the terminal device 1900 and process data, thereby monitoring the terminal device 1900 as a whole.

In the embodiments of the present disclosure, the processor 1901 of the terminal device 1900 will follow the following operations. The processor 1901 loads instructions corresponding to a process of at least one application into the memory 1902, and executes the application stored in the memory 1902, thereby implementing various functions. The functions include: invoking the video component in response to a playing instruction for a target video; searching a video stream multiplexing pool corresponding to the video component for a first video stream identical to the target video, to play the target video based on the first video stream, the video stream multiplexing pool having stored thereon video streams that have been played by the video component; synchronizing a playing progress of the target video in a video feed list with a playing progress of the target video in a video detail page during playing of the target video; and controlling, in response to a touch operation on a small window button of the video component, a small window control of the video component to display and play the target video, or controlling, in response to a touch operation on a full screen button of the video component, a full screen control of the video component to display the target video.

The specific implementation of each of the above operations may refer to the previous embodiments, which will not be repeated herein.

In some embodiments, as illustrated in FIG. 19, the terminal device 1900 further includes a display unit 1903, a radio frequency (RF) circuit 1904, an audio circuit 1905, an input unit 1906, and a power supply 1907. The processor 1901 is electrically connected to the display unit 1903, the RF circuit 1904, the audio circuit 1905, the input unit 1906, and the power supply 1907, respectively. Those skilled in the art will appreciate that the terminal device structure illustrated in FIG. 19 does not constitute limitation to the terminal device, and may include more or fewer components than illustrated, or combination of some of the components, or different arrangements of the components. The display unit 1903 may be configured to display information inputted by the user or information provided to the user as well as various graphical user interfaces of the terminal device. These graphical user interfaces may be composed of graphics, text, icons, videos, and any combination thereof. The display unit 1903 may include a display panel and a touch panel. The radio-frequency circuit 1904 may be configured to transmit and receive radio frequency signals, to establish wireless communication with a network device or other terminal device through wireless communication, and to transmit and receive signals with the network device or other terminal device. The audio circuit 1905 may be configured to provide an audio interface between the user and the terminal device through speakers and microphones. The input unit 1906 may be configured to receive inputted numbers, character information, or user characteristic information (e.g., fingerprint, iris, face information, etc.), and generate signal input of keyboard, mouse, joystick, optical, or trackball related to user setting and functional control. The power supply 1907 is configured to power the various components of the terminal device 1900. Although not shown in FIG. 19, the terminal device 1900 may further include a camera, a sensor, a wireless fidelity module, a Bluetooth module, etc., which will not be repeated herein.

The specific implementation of each of the above operations may refer to the previous embodiments, which will not be repeated herein.

Those skilled in the art will appreciate that all or some of the operations in the various methods of the above embodiments may be implemented by instructions or related hardware controlled by instructions. The instructions may be stored in a computer-readable storage medium, and be loaded and executed by the processor.

To this end, the embodiments of the present disclosure provide a computer-readable storage medium having a plurality of computer programs stored thereon. The computer programs can be loaded by the processor to perform the operations in the video playing method according to any one of the embodiments of the present disclosure. The storage medium may include: a Read Only Memory (ROM), a Random Access Memory (RAM), a disk, an optical disk, or the like. Since the computer programs stored in the storage medium can perform the operations in the video playing method according to any one of the embodiments of the present disclosure, the advantageous effects achieved by the video playing method according to any one of the embodiments of the present disclosure can be achieved. Specific description may refer to the previous embodiments, which will not be repeated herein.

The video playing method and apparatus, and the storage medium according to the embodiments of the present disclosure are described in detail above, and in the present disclosure, specific examples are used to describe the principle and implementation of the present disclosure. The description of the above embodiments is only used to help understand the method of the present disclosure and its core ideas. At the same time, those skilled in the art may make changes in the specific implementation and scope of the present disclosure according to the ideas of the present disclosure. In summary, the content of this specification should not be understood as restriction on the present disclosure.

What is claimed is:

1. A video playing method, applied to a client configured with a video component, the video playing method comprising:
    invoking the video component in response to a playing instruction for a target video;
    searching a video stream multiplexing pool corresponding to the video component for a first video stream identical to the target video, to play the target video based on the first video stream, the video stream multiplexing pool having stored thereon video streams that have been played by the video component, wherein the video component comprises a focus management layer, the focus management layer being configured to transmit, prior to playing the target video, a target focus notification corresponding to the target video and identity information corresponding to the target focus notification to another video component, wherein the target focus notification is used to instruct, in response to a focus preemption, the another video component to release a focus, wherein the video component is controlled to play the target video, in response to monitoring, by means of the focus management layer, a release of the focus transmitted by the other video component and identity information corresponding to the released focus, and wherein the video component is a component provided in a current application (APP), and the other video component is a component provided in another APP or in the current APP other than the video component;

synchronizing a playing progress of the target video in a video feed list with a playing progress of the target video in a video detail page during playing of the target video; and controlling, in response to a touch operation on a small window button of the video component, a small window control of the video component to display and play the target video, or controlling, in response to a touch operation on a full screen button of the video component, a full screen control of the video component to display the target video.

2. The video playing method according to claim 1, wherein said searching the video stream multiplexing pool corresponding to the video component for the first video stream identical to the target video, to play the target video based on the first video stream comprises:

searching the video stream multiplexing pool corresponding to the video component to determine whether the first video stream identical to the target video exists in the video stream multiplexing pool corresponding to the video component;

obtaining the first video stream to play, based on the first video stream, the target video, in response to determining that the first video stream identical to the target video exists in the video stream multiplexing pool; or loading a second video stream corresponding to the target video to play, based on the second video stream, the target video, in response to determining that no first video stream identical to the target video exists in the video stream multiplexing pool.

3. The video playing method according to claim 1, wherein said synchronizing the playing progress of the target video in the video feed list with the playing progress of the target video in the video detail page during the playing of the target video comprises:

synchronizing the playing progress of the target video in the video feed list to the video detail page, in response to jumping from the video feed list to the video detail page based on an obtained first page jumping instruction; or synchronizing the playing progress of the target video in the video detail page to the video feed list, in response to jumping from the video detail page to the video feed list based on an obtained second page jumping instruction.

4. The video playing method according to claim 1, wherein the video component further comprises a network interception interface, the video playing method further comprising:

displaying, in response to the network interception interface monitoring a change in a network state, prompt information of the change in the network state on a display interface of the client.

5. The video playing method according to claim 4, wherein said controlling, in response to the touch operation on the small window button of the video component, the small window control of the video component to display and play the target video comprises:

when the small window control is located on the video detail page, pausing playing of a video on the video detail page and controlling the small window control to play the target video, and controlling, in response to detecting that the small window control pauses the playing of the target video or the small window control is disabled, the video on the video detail page to be automatically played when the network state is in an wireless fidelity (wifi) environment; or when the small window control is located on the video feed list, pausing playing of a video on the video feed list and controlling the small window control to play the target video, and controlling, in response to detecting that the small window control pauses the playing of the target video or the small window control is disabled, the video on the video feed list to be automatically played when the network state is in an wireless fidelity (wifi) environment.

6. The video playing method according to claim 5, further comprising, during said controlling the small window control to play the target video:

controlling, in response to obtaining a live stream access request for a target live stream, the small window control to close the target video and play the target live stream.

7. The video playing method according to claim 5, further comprising, when the small window control is located on the video details page:

displaying the small window control on the video detail page in a floating layer manner;

jumping from the small window control to the video detail page in response to a touch operation on a jump icon on the small window control; and invoking or hiding the small window control in response to a touch operation on a blank space of the small window control.

8. The video playing method according to claim 4, further comprising:

when the video component is controlled to access a background, pausing the target video that is playing currently; and when the video component is invoked back to a foreground, re-determining, based on a current network state, a video playing setup item, and a historical video playing state when the video component accesses the background, a current playing state of the target video.

9. The video playing method according to claim 1, further comprising:

providing a video component multiplexing pool.

10. The video playing method according to claim 9, wherein said invoking the video component comprises:

invoking the first video component in response to determining that a first video component exists in the video component multiplexing pool, the first video component corresponding to a video that is identical to the target video to be played currently.

11. The video playing method according to claim 9, wherein said invoking the video component comprises:

invoking, in response to determining that a plurality of invoked video components exists in the video component multiplexing pool, a second video component with a fastest video loading speed from the plurality of invoked video components in the video component multiplexing pool.

12. The video playing method according to claim 9, wherein said invoking the video component comprises:

invoking, in response to determining that a plurality of invoked video components exists in the video component multiplexing pool, a third video component with a lowest Central Processing Unit (CPU) occupancy and/or a lowest memory occupancy from the plurality of invoked video components in the video component multiplexing pool.

13. The video playing method according to claim 1, further comprising:

determining, based on pre-divided loading blocks of different sizes in loading mediums, a loading block corresponding to target data, and temporarily storing the target data in the loading block corresponding to the target data.

14. The video playing method according to claim 13, wherein said determining, based on the pre-divided loading blocks of different sizes in the loading mediums, the loading block corresponding to the target data, and temporarily storing the target data in the loading block corresponding to the target data comprises:

pre-dividing the loading blocks of different sizes in each of the loading mediums, the loading blocks of different sizes being incremented by an incremental factor, and the incremental factor being determined based on an average expected size of the target data;

determining a loading capacity of each of the loading blocks based on a minimum block capacity in the loading medium and the incremental factor;

determining a total loading capacity of the loading medium based on the loading capacity of the loading block;

determining, based on the total loading capacity of the loading medium, a target loading medium corresponding to the target data; and determining the loading block corresponding to the target data from a target storage medium based on a size of the target data, and temporarily storing the target data in the loading block corresponding to the target data.

15. The video playing method according to claim 13, wherein the target data comprises the target video, the video playing method further comprising:

loading, in response to playing the target video, the target video from one of the loading blocks corresponding to the target video.

16. The video playing method according to claim 1, wherein said invoking the video component in response to the playing instruction for the target video comprises:

in response to the playing instruction for the target video, adding the video component to a layout file, and transferring data of the target video to the video component in a code file, to invoke the video component.

17. The video playing method according to claim 1, further comprising:

clearing a video stream corresponding to the target video, in response to the target video that is currently playing being closed and the target video being a last video stream in the video stream multiplexing pool.

18. A video playing apparatus, applied to a client configured with a video component, the video playing apparatus comprising:

an invocation module configured to invoke the video component in response to a playing instruction for a target video;

a playing module configured to search a video stream multiplexing pool corresponding to the video component for a first video stream identical to the target video, to play the target video based on the first video stream, the video stream multiplexing pool having stored thereon video streams that have been played by the video component, wherein the video component comprises a focus management layer, the video component being configured to transmit, prior to playing the target video, a target focus notification corresponding to the target video and identity information corresponding to the target focus notification to another video component, wherein the target focus notification is used to instruct, in response to a focus preemption, the other video component to release a focus, wherein the video component is controlled to play the target video, in response to monitoring, by means of the focus management layer, a release of the focus transmitted by the other video component and identity information corresponding to the released focus, and wherein the video component is a component provided in a current APP, and the other video component is a component provided in another APP or in the current APP other than the video component;

a synchronization module configured to synchronize a playing progress of the target video in a video feed list with a playing progress of the target video in a video detail page during playing of the target video; and a control module configured to control, in response to a touch operation on a small window button of the video component, a small window control of the video component to display and play the target video, or control, in response to a touch operation on a full screen button of the video component, a full screen control of the video component to display the target video.

19. A non-transitory computer-readable storage medium, having computer programs stored thereon, wherein the computer programs are adapted to be loaded by a processor to implement the video playing method according to claim 1.

* * * * *